United States Patent [19]

Hobson et al.

[11] Patent Number: 5,654,841

[45] Date of Patent: Aug. 5, 1997

[54] DETECTION OF MECHANICAL DEFECTS IN A DISC DRIVE USING INJECTED TEST SIGNALS

[75] Inventors: Daniel E. Hobson, Yokon; Wayne L. Felts, Oklahoma City; Randall D. Hampshire, Edmond, all of Okla.

[73] Assignee: Seagate Technology, Inc., Scotts Valley, Calif.

[21] Appl. No.: 498,621

[22] Filed: Jul. 7, 1995

[51] Int. Cl.⁶ .................................. G11B 21/02
[52] U.S. Cl. ................ 360/75; 360/31; 360/77.04; 360/78.09; 324/210; 395/500
[58] Field of Search .................. 360/75, 77.05, 360/78.14, 130.34, 135, 48; 369/4, 32, 38, 43, 44.25, 44.26, 44.28; 370/100.1; 371/20.4, 5.4, 5.5; 395/275, 425, 500; 324/210, 212

[56] References Cited

U.S. PATENT DOCUMENTS

| | | | |
|---|---|---|---|
| 4,623,942 | 11/1986 | Kraus et al. | 360/75 |
| 4,764,860 | 8/1988 | Takao | 369/43 |
| 5,262,907 | 11/1993 | Duffy et al. | 360/77.05 |
| 5,305,158 | 4/1994 | Ueda et al. | 360/75 |
| 5,339,206 | 8/1994 | Takahashi | 360/75 |
| 5,397,971 | 3/1995 | McAllister et al. | 318/254 |
| 5,465,183 | 11/1995 | Hattori | 360/78.6 |

*Primary Examiner*—Aristotelis Psitos
*Assistant Examiner*—Kin Wong
*Attorney, Agent, or Firm*—Bill D. McCarthy; Edward P. Heller, III; Randall K. McCarthy

[57] ABSTRACT

A method and apparatus for testing for mechanical defects in a disc drive during manufacturing test is disclosed. Resonances in the disc drive are excited by injecting a sinusoidal test signal of known magnitude and frequency into an incoming servo position error (SPE) signal in the servo loop to provide a modified SPE. While the test signal is injected, the modified SPE is sampled and filtered to characterize the test frequency in the modified SPE which is compared to a resultant frequency characterized in the incoming SPE. The presence of resonances in the disc drive structure will result in an increase in the gain of the loop as indicated by the characterized resonant frequencies from the incoming and modified SPE. When the gain exceeds predetermined criteria, an error flag is set indicative of a failure condition for the disc drive, enabling the disc drive to be removed from test for subsequent remedial actions.

8 Claims, 14 Drawing Sheets

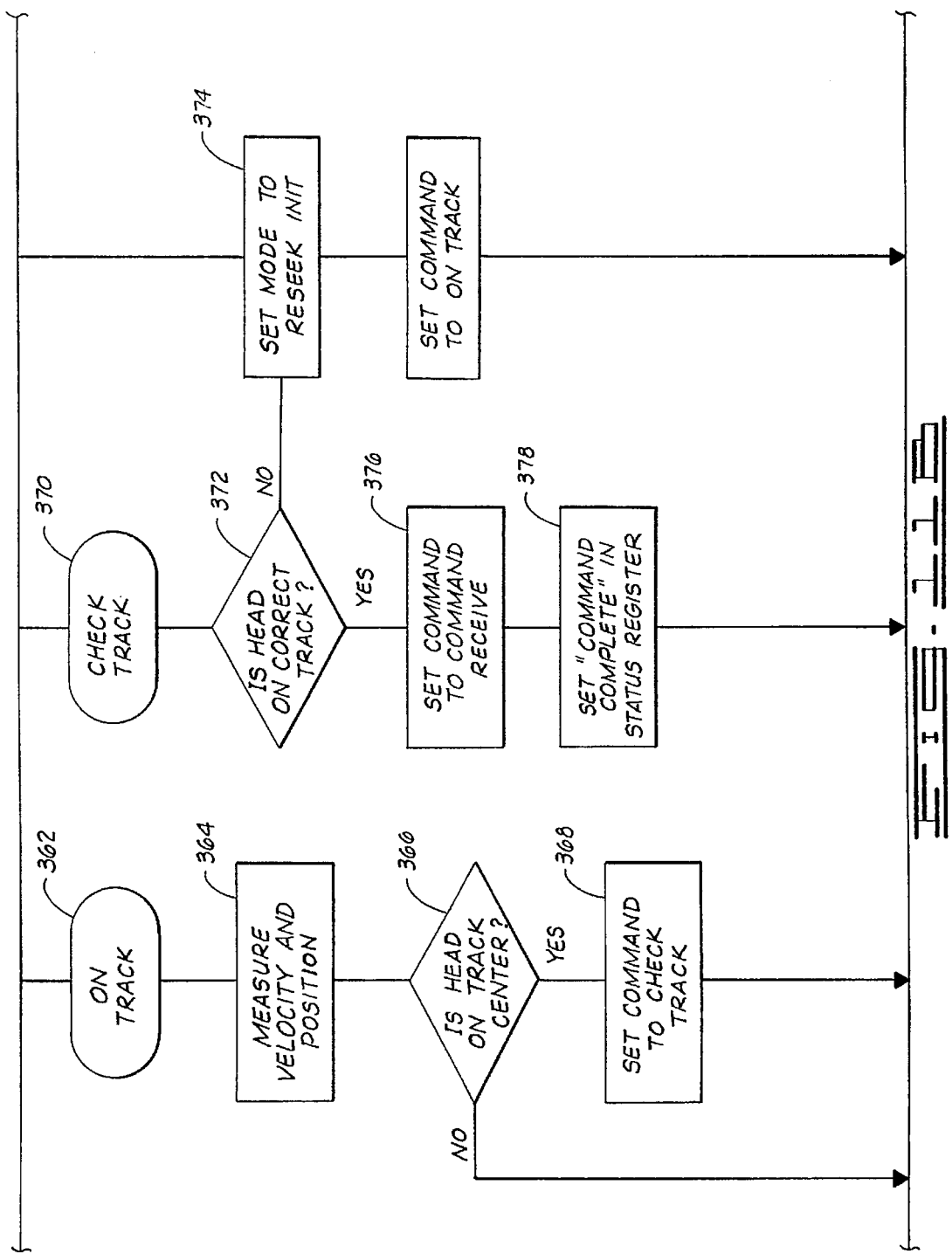

| NO. OF SKIPPED DATA POINTS | SPE AVERAGE = 1 | | SPE AVERAGE = 2 | | SPE AVERAGE = 4 | | SPE AVERAGE = 8 | | SPE AVERAGE = 16 | |
|---|---|---|---|---|---|---|---|---|---|---|
| | FREQUENCY (HZ) | BAND WIDTH | FREQUENCY (HZ) | BAND WIDTH | FREQUENCY (HZ) | BAND WIDTH | FREQUENCY (HZ) | BAND WIDTH | FREQUENCY (HZ) | BAND WIDTH |
| 0 | DC | 721 | DC | 361 | DC | 180 | DC | 90 | DC | 45 |
| 1 | 361 | 721 | 180 | 361 | 90 | 180 | 45 | 90 | 23 | 45 |
| 2 | 721 | 721 | 361 | 361 | 180 | 180 | 90 | 90 | 45 | 45 |
| 3 | 1082 | 721 | 541 | 361 | 271 | 180 | 135 | 90 | 68 | 45 |
| 4 | 1443 | 721 | 721 | 361 | 361 | 180 | 180 | 90 | 90 | 45 |
| 5 | 1804 | 721 | 902 | 361 | 451 | 180 | 225 | 90 | 113 | 45 |
| 6 | 2164 | 721 | 1082 | 361 | 541 | 180 | 271 | 90 | 135 | 45 |
| 7 | 2525 | 721 | 1263 | 361 | 631 | 180 | 316 | 90 | 158 | 45 |
| 8 | 2886 | 721 | 1443 | 361 | 721 | 180 | 361 | 90 | 180 | 45 |
| 9 | 3246 | 721 | 1623 | 361 | 812 | 180 | 406 | 90 | 203 | 45 |
| 10 | 3607 | 721 | 1804 | 361 | 902 | 180 | 451 | 90 | 225 | 45 |
| 11 | 3968 | 721 | 1984 | 361 | 992 | 180 | 496 | 90 | 248 | 45 |
| 12 | 4329 | 721 | 2164 | 361 | 1082 | 180 | 541 | 90 | 271 | 45 |
| 13 | 4689 | 721 | 2345 | 361 | 1172 | 180 | 586 | 90 | 293 | 45 |
| 14 | 5050 | 721 | 2525 | 361 | 1263 | 180 | 631 | 90 | 316 | 45 |
| 15 | 5411 | 721 | 2705 | 361 | 1353 | 180 | 676 | 90 | 338 | 45 |
| 16 | 5771 | 721 | 2886 | 361 | 1443 | 180 | 721 | 90 | 361 | 45 |
| 17 | 6132 | 721 | 3066 | 361 | 1533 | 180 | 767 | 90 | 383 | 45 |
| 18 | 6493 | 721 | 3246 | 361 | 1623 | 180 | 812 | 90 | 406 | 45 |
| 19 | 6854 | 721 | 3427 | 361 | 1713 | 180 | 857 | 90 | 428 | 45 |
| 20 | 7214 | 721 | 3607 | 361 | 1804 | 180 | 902 | 90 | 451 | 45 |
| 21 | 7575 | 721 | 3788 | 361 | 1894 | 180 | 947 | 90 | 473 | 45 |
| 22 | 7936 | 721 | 3968 | 361 | 1984 | 180 | 992 | 90 | 496 | 45 |
| 23 | 8297 | 721 | 4148 | 361 | 2074 | 180 | 1037 | 90 | 519 | 45 |
| 24 | 8657 | 721 | 4329 | 361 | 2164 | 180 | 1082 | 90 | 541 | 45 |
| 25 | 9018 | 721 | 4509 | 361 | 2254 | 180 | 1127 | 90 | 564 | 45 |
| 26 | 9379 | 721 | 4689 | 361 | 2345 | 180 | 1172 | 90 | 586 | 45 |
| 27 | 9739 | 721 | 4870 | 361 | 2435 | 180 | 1217 | 90 | 609 | 45 |
| 28 | 10100 | 721 | 5050 | 361 | 2525 | 180 | 1263 | 90 | 631 | 45 |
| 29 | 10461 | 721 | 5230 | 361 | 2615 | 180 | 1308 | 90 | 654 | 45 |
| 30 | 10822 | 721 | 5411 | 361 | 2705 | 180 | 1353 | 90 | 676 | 45 |
| 31 | 11182 | 721 | 5591 | 361 | 2796 | 180 | 1398 | 90 | 699 | 45 |

FIG. 14

DETECTION OF MECHANICAL DEFECTS IN A DISC DRIVE USING INJECTED TEST SIGNALS

BACKGROUND OF THE INVENTION

1. Field of the Invention

This invention relates generally to the field of disc drive data storage devices, and more particularly, but not by way of limitation, to a method and apparatus for the detection of certain mechanical defects in a disc drive.

2. Background of the Invention

Disc drives of the type referred to as "Winchester" disc drives are well-known in the industry. In such devices, one or more rigid discs, coated with a magnetizable medium, are mounted on the hub of a spindle motor for rotation at a constant high speed. Disc drives of the present generation use spindle motors rotating at up to 7200 RPM.

Information is stored on the discs in a plurality of concentric circular tracks by an array of transducers, or heads (usually one per disc surface) mounted for movement to an electronically controlled actuator mechanism. The storing of information on the discs is sometimes also referred to as "writing", and the subsequent retrieval of information from the discs is also called "reading".

Presently, the most commonly used type of actuator mechanism is the rotary voice coil actuator, sometimes referred to as a rotary moving-coil actuator. With this type of actuator, the transducers used to write and read data are mounted via flexures at the ends a plurality of head arms which project radially outward from a substantially cylindrical actuator body. The actuator body is journaled via ball bearing assemblies to rotate about a pivot shaft which is mounted to the disc drive housing at a position closely adjacent the outer extreme of the discs. The pivot shaft is intended to be in parallel with the axis of rotation of the spindle motor and the discs. The transducers will thus move in a plane parallel with the surfaces of the discs.

A coil is mounted on the side of the actuator body opposite the head arms. The coil is mounted so as to be immersed in the magnetic field of an array of permanent magnets which are in turn mounted to the disc drive housing. When controlled DC current is passed through the coil, an electromagnetic field is set up which interacts with the magnetic field of the permanent magnets and causes the coil to move relative to the permanent magnets in accordance with the well-known Lorentz relationship. As the coil moves relative to the permanent magnets, the actuator body pivots about the pivot shaft and the heads are moved across the disc surfaces.

Control of the movement of the heads is achieved with a closed loop servo system and details of such a servo system can be found in U.S. Pat. No. 5,262,907, issued to Duffy et al., assigned to the assignee of the present invention and incorporated herein by reference. In such a system, position or servo information is prerecorded on at least one surface of one of the discs. The servo system can be either a "dedicated" servo system, in which one entire disc surface is prerecorded with the servo information and a dedicated servo head is used to constantly read the servo information, or an "embedded" servo system, in which servo information is interleaved with user data and intermittently read by the same heads used to read and write the user data.

With either a dedicated or embedded servo system, it is common that the servo circuitry produce a servo position error (SPE) signal which is indicative of the position of the head relative to the center of a track. The identity of the particular track, as well as other information relating to the circumferential position of the head on the track, is included, along with other information, in the prerecorded servo information. Thus, when the heads are following a desired track, the SPE is essentially at a zero value. The SPE is fed back to circuitry used to control current through the coil of the actuator. Any tendency of the heads to deviate from true track center causes the SPE to change from its zero value. The SPE is a bipolar analog signal, meaning that deviation of the head position away from track center in a first direction will produce a SPE of a first polarity, while movement of the heads off track center in the opposite direction will produce an SPE of the opposite polarity, and the greater the distance of the head from track center, the greater the magnitude of the SPE signal. It should be noted that the SPE signal relates to each track centerline, and, as such, when the actuator is seeking from one track to another, the SPE signal switches from maximum offset value from a first track in a first direction to maximum offset value from a second track in the opposite direction as the moving head passes the midpoint between the first and second tracks.

In the manufacture of disc drives, it is not unusual for tens of thousands of disc drive units to be fabricated daily. With such high numbers of disc drives being made, it is apparent that a certain number of units will fail to meet the design specifications, due to faulty components, improper assembly, contamination, and other elements familiar to those of skill in the art. While every effort is made by disc drive manufacturers to minimize these defective units and assembly errors, a small percentage of defective units will occur. When the defect is introduced into the unit at an early stage in the manufacturing process, the fault may not be detected until a much later stage of the process. Such a delay in the detection of defective assemblies can result in a significant amount of labor costs when taken over the large numbers of units being manufactured.

It has been found that several mechanical defects that can commonly be introduced into the assembly of a disc drive can be closely correlated to the introduction of susceptibility of the unit to resonances at fixed "marker" frequencies. This correlation has come about empirically with the experience of building hundreds of thousands of identical products. With this knowledge, it follows that if the disc drive units can be tested for resonance at the marker frequencies, early detection of the manufacturing defects is possible.

It has been found that resonant frequencies in a mechanical structure can sometimes be identified through the use of a frequency analyzer which, once properly connected to the structure to be tested, injects energy at a selected frequency and then evaluates the structure for gain and phase response in the energy which would be indicative of resonance. While the use of a frequency analyzer as an engineering diagnostic tool is well known in the industry, it does have several drawbacks which make such use impractical for large-scale implementation in disc drive manufacturing test operations. Firstly, a frequency analyzer is a complex and expensive piece of diagnostic test equipment, costing several thousand dollars per unit. In a manufacturing environment producing tens of thousands of units per day, a large number of frequency analyzers would be needed in order to provide adequate test capability for the quantity of drives being manufactured, resulting in economically prohibitive capital costs for the manufacturer. Secondly, connecting an analyzer to each structure to be tested and performing the test would require both an operator and a significant amount of time, two elements antithetical to such a high volume production environment. Thirdly, the implementation of automated test result reporting and evaluation with such discrete test equipment would be difficult and resource intensive.

It has also been found that testing for sympathetic resonances in a structure can be accomplished by mounting the unit to be tested to a vibration table, and then injecting either sinusoidal or random vibration energy into the unit during operation and then monitoring for resonant frequencies using suitable test equipment. Again, such a method, although useful during development of a disc drive, would be economically impractical for implementation during large scale manufacture due to capital equipment and resource requirements.

One method for testing for the presence of specific marker frequencies associated with known mechanical defects and apparatus for implementing the method are described in detail in co-pending U.S. patent application Ser. No. 08/499,388, (Waugh et al.), entitled "Testing for Mechanical Defects in a Disc Drive Using Detected Resonant Frequencies", filed simultaneously with the present application, assigned to the assignee of the present application and incorporated herein by reference. The method taught in this incorporated reference, while operative and effective, does entail the requirement of implementing special test seeks in order to excite broad spectrum resonance in the disc drive structure and is therefore restricted to those frequencies that can thus be excited. Further, the method is only applicable to those resonant frequencies which fall outside the operational bandwidth of the servo system itself and are therefore are not immediately damped by the servo control operation, and the method requires that testing for the specific resonant frequencies be accomplished immediately after said excitation of the disc drive structure by the special test seek operation in order to detect and characterize such frequencies prior to natural attenuation.

It would, therefore, be desirable to provide a method and apparatus for testing for mechanical defects in disc drives by detecting resonances at corresponding marker frequencies, and sorting out units failing the test procedure for repair or remanufacture, while allowing passing units to continue onward in the manufacturing process. It would also be preferable if the test methodology involved a minimum of cost, both in human operator time and capital investment.

SUMMARY OF THE INVENTION

The present invention provides a method and apparatus for testing for mechanical defects in a disc drive using detected resonant frequencies. In the preferred embodiment, resonances are excited by injecting a sinusoidal test signal of known magnitude and frequency into an incoming servo position error (SPE) signal in the servo loop, the SPE being a signal indicative of the relative position of the heads to the centerline of the target track. The injection of this test signal provides a modified SPE, the modified SPE comprising both the preexisting information from the incoming SPE as well as the additional test signal information.

While the test signal is injected, the modified SPE is sampled and filtered to characterize a the test frequency in the modified SPE (as a result of the injected test signal) in terms of magnitude and phase and this characterization is compared during an evaluation step to the results of a similar sampling and filtering operation that takes place in the incoming SPE prior to the injection of the test signal (that is, the incoming SPE from the servo head is also sampled and filtered before receiving the injected test signal to characterize a frequency in the SPE). In this way, gain in the servo loop may be measured as a ratio of the magnitude of the frequency in the incoming SPE over the magnitude of the measured frequency in the modified SPE. Any localized increase in gain over the frequency range will generally be the result of resonance in the disc drive structure induced by the injection of the test signal into the SPE. The evaluation of such gain detected during this evaluation results in the setting of an error flag at such times that the gain contains such a localized peak, indicative of a failure of the disc drive, which may subsequently be removed from the test for remedial actions. The sampling and filtering operation on both the incoming SPE and the modified SPE may be performed by way of a Discrete Fourier Transform (DFT).

It is an object of the present invention to provide a method and apparatus for testing for resonant frequencies that have been empirically associated with the specific mechanical defect.

It is another object of the invention to provide the test method and apparatus for performing the test method in a manner that is cost-effective in terms of labor, time and capital investment.

Other objects, advantages and features of the present invention will be apparent from the following description when read in conjunction with the drawings and appended claims.

BRIEF DESCRIPTION OF THE DRAWINGS

The features, benefits and objects of the invention can be best understood from the following detailed description of the invention when read in conjunction with the following drawings.

FIG. 5 is a block diagram of a typical high volume test system used during the manufacture of disc drives and capable of performing the method of the present invention.

FIG. 6 is a flow diagram of the program executed by one of the host computer systems shown in FIG. 5.

FIGS. 11A–11C are flow diagrams of a second level portion of the interrupt service routine executed by the servo microprocessor of the servo system of FIGS. 2 and 4.

FIG. 14 is a table showing a number of frequencies and bandwidths of test signals that may be injected into the SPE in accordance with the present invention.

DETAILED DESCRIPTION OF THE PREFERRED EMBODIMENT

Figure 1:
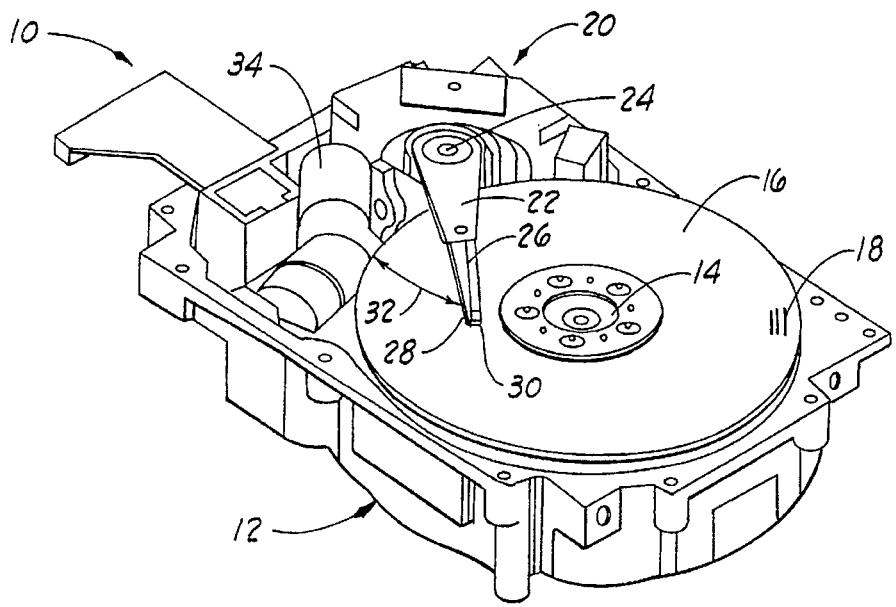
FIG. 1 is a perspective view of a disc drive in which the present invention is particularly useful.

Turning now to the drawings and more particularly to FIG. 1, shown is a perspective view of a disc drive 10 of the type in which the present invention is particularly useful. The disc drive 10 includes a housing base 12 and a top cover (not shown) which cooperatively engage to form a sealed housing which serves to protect delicate internal components from external contaminants.

A plurality of discs 16 are mounted for rotation on a spindle motor hub 14 using a disc clamp (not designated). In this example, the disc clamp is secured using screws (also not designated) equally spaced about the perimeter of the disc clamp. An array of heads (one shown at 30) is mounted via flexure assemblies 26 to an actuator body which is adapted for pivotal motion about a pivot shaft 24 under control of an actuator motor, shown generally at 20.

The actuator motor 20 is driven by electronic circuitry (not shown) to controllably move the heads 30 to any desired one of a plurality of concentric circular tracks 18 on the discs 16 along arcuate path 32. Signals used to control the actuator motor 20, as well as signals to and from the heads 30, are passed via a printed circuit cable 34.

Because the disc drive 10 illustrated in FIG. 1 includes the actuator motor 20 of the type known as a voice coil motor (VCM), or moving coil motor, the disc drive 10 must also include electronic control logic for moving the heads 30 to any one track 18, and maintaining the heads 30 closely adjacent the track for storing and retrieving data. This control logic is usually referred to as a servo system, and a typical servo system is shown in FIG. 2.

Figure 2:
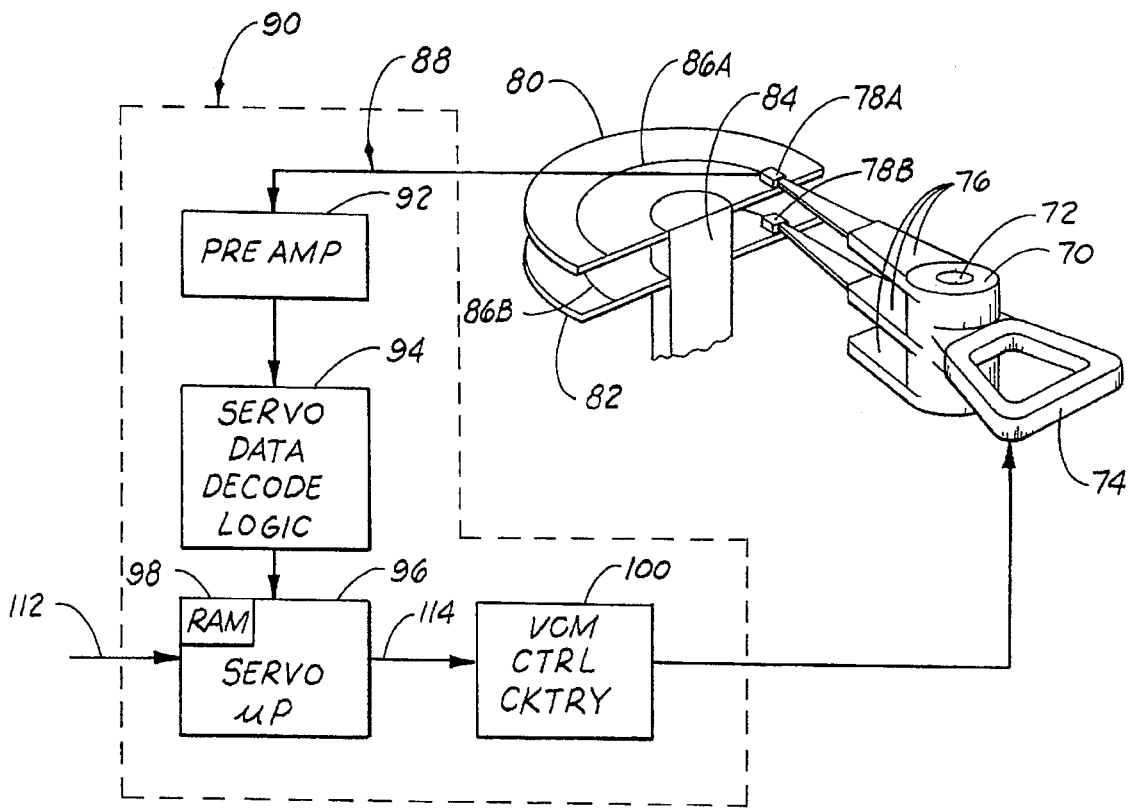
FIG. 2 is a block diagram of the servo system used to control the actuator of the disc drive of FIG. 1.

FIG. 2 is a simplified block diagram of a servo system in which the present invention is particularly useful. Shown in FIG. 2 is an actuator body 70 which pivots about a pivot shaft 72 when drive current is applied to a coil 74 which lies between a pair of permanent magnets (not shown). On the opposite side of the actuator body 70 from the coil 74 is a plurality of head mounting arms 76 which in turn support a number of heads, two of which have been shown as 78A, 78B are arrayed to cooperate with a stack of discs 80, 82 mounted for rotation on a spindle motor 84. While, in actual disc drives, there could be a larger number of discs, and a head associated with each disc surface, for purposes of clarity, only two discs 80, 82 and two heads 78A, 78B are shown.

For this and the following discussion, it will be assumed that the disc drive 10 of the present discussion employs a dedicated servo system, so that the top head 78A is a servo head and the top surface of the top disc 80 is a servo disc that contains prerecorded positional servo information. It will be recognized, however, that the present invention is not dependent upon the use of a particular type of servo system, and that the present invention could be utilized in a disc drive employing an embedded servo system.

Returning to FIG. 2, for clarity all other heads and discs will be referred to as "data heads" or "read/write heads" and "data discs", respectively. As will be recognized, the basic principle of operation of the servo system is that, if the servo head 78A can be made to seek to and follow a given servo track 86A on the servo disc 80, all data heads 78B will simultaneously seek to and follow corresponding data tracks 86B. To facilitate this seeking and track following, servo data 88 road from the servo disc 80 is directed into a servo loop 90 which consists of a preamplifier 92, servo data decode logic 94 which includes an analog-to-digital (A/D) converter (not separately shown), a servo microprocessor 96 with associated RAM 98 and a VCM control circuit 100, which includes a power amp and a digital-to-analog (D/A) converter (both of which are not separately shown). A detailed description of the servo loop 90 can be found in U.S. Pat. No. 5,262,907 entitled HARD DISC DRIVE WITH IMPROVED SERVO SYSTEM, incorporated herein by reference. Before continuing with this discussion, it is perhaps better at this time to describe the format of the servo information prerecorded on the servo disc 80.

Figure 3:
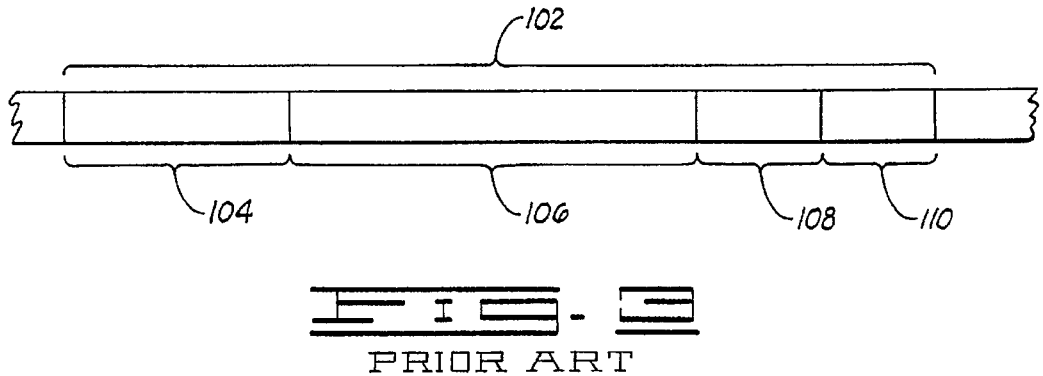
FIG. 3 is a diagrammatic representation of a single frame of servo information for the servo system of FIG. 2.

The servo information on the servo disc 80 is recorded at the time of manufacture using a highly precise servo writer. Servo tracks correspond to the locations of data tracks on the other disc surfaces. Each servo track is divided circumferentially into a fixed number of frames, and the format of one such servo frame is shown in FIG. 3. As shown in FIG. 3, each frame 102 is further divided into four separate fields, specifically an address field 104, a position field 106, a sector field 108, and a sync field 110. The function of the address field 104 is to provide a track address; that is, to define the approximate radial position of the head when the address field 104 is read. The position field 106 is used to define the exact radial position of the servo head relative to the servo track. The sector field 108 is encoded with information defining the circumferential position of the disc relative to the head and the sync field 110 is used to aid in the development of timing signals. Each frame 102 requires approximately 420 nanoseconds to pass below the servo head and there are 400 of these frames 102 per track if the discs 80, 82 are rotating at 3600 RPM, or 300 frames if the discs 80, 82 are rotating at 4800 RPM. Furthermore, the final sync field 110 of the final frame 102 contains special coding to define the beginning of each track and allow the generation of an index signal.

Referring now to both FIGS. 2 and 3, the servo microprocessor 96 runs a loop program waiting for the servo data decode logic 94 to generate the index signal. At specifically timed intervals during the time the servo frame 102 passes under the servo head 78A, an interrupt is sent to the servo microprocessor 96 and the information in the servo frame 102 is read by the servo microprocessor 96, thus keeping the servo microprocessor 96 constantly aware of the radial and circumferential position of the servo head 78A and, therefore, the data heads 78B as well. The use that the servo microprocessor 96 makes of this information depends on the operational mode of the disc drive at the time of the interrupt. That is, if the disc drive is in a track following mode, the servo loop 90 simply decodes the information in the servo frame 102 to maintain the servo head 78A centered on the current track. If, however, the servo microprocessor 96 has received a command to seek from the current track to another track on command path 112, the servo microprocessor 96 sends a digital value on signal path 114 which causes the VCM control circuit 100 to apply a controlled DC voltage of the proper polarity to begin moving the actuator in a controlled manner to the desired track. The specifics of track following and seeking are described in more detail in U.S. Pat. No. 5,262,907, incorporated hereinabove by reference.

Figure 4:
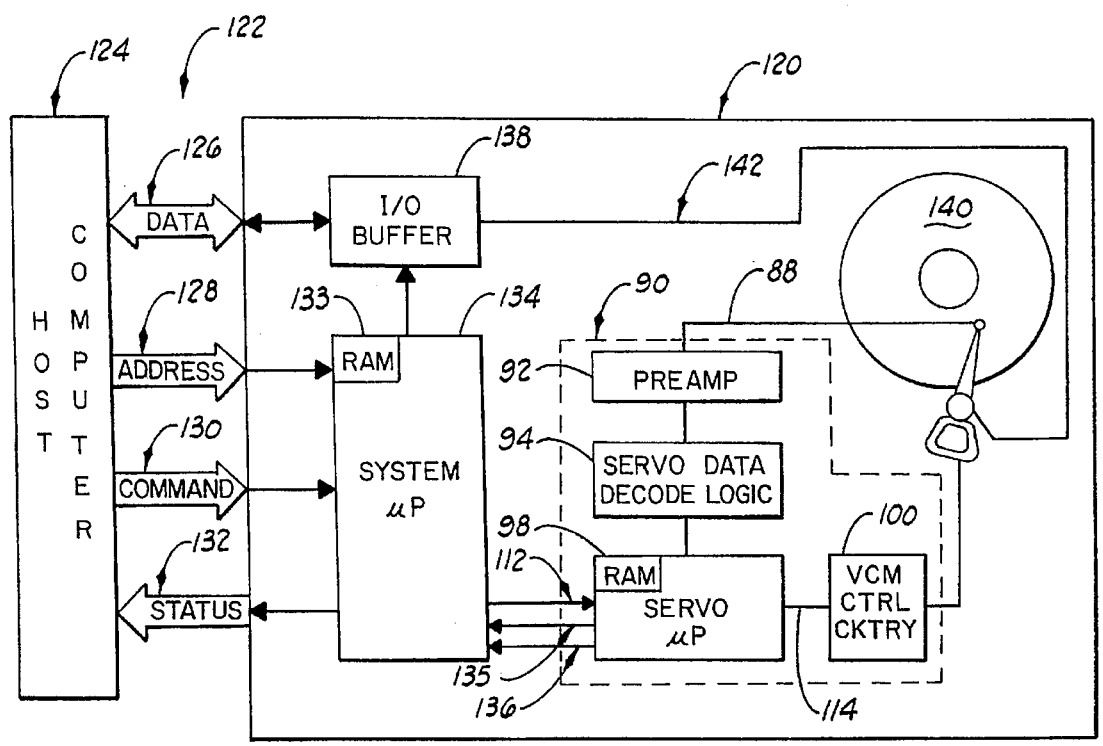
FIG. 4 is a block diagram of the disc drive of FIG. 1 showing the internal electronic circuitry and connection to a host computer system.
Figure 3:
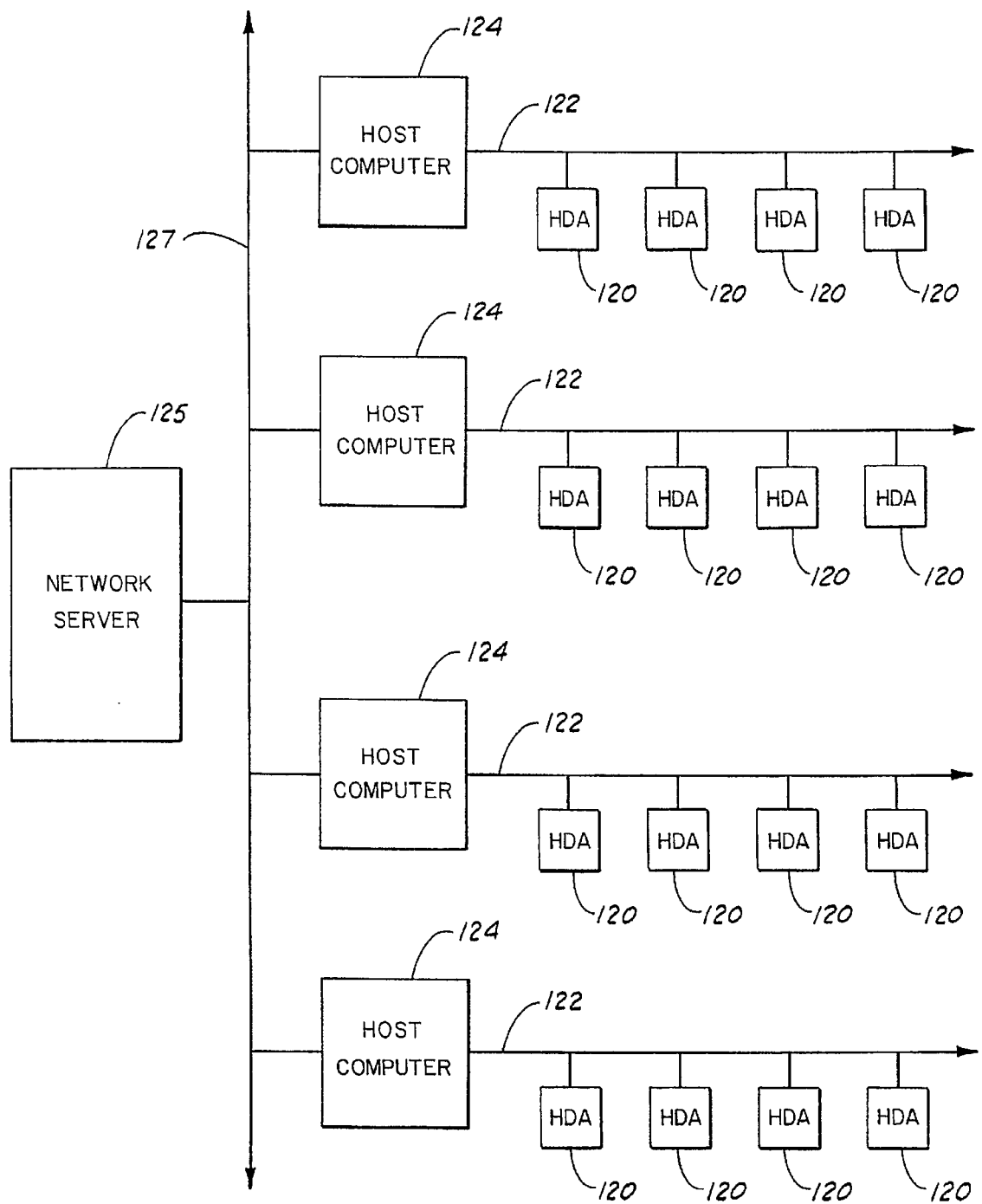

An overall system block diagram is shown in FIG. 4, with the servo loop 90 of FIG. 4 included within a disc drive 120. A host interface 122 connects the disc drive 120 to a host computer system 124. Although FIG. 4 shows a single disc drive 120 connected to the host computer system 124, the host interface 122 is typically capable of connecting and supporting a plurality of individual disc drives. The host interface 122 includes a bi-directional data bus 126, an address bus 128 for passing logical bus addresses (LBAs) from the host computer system 124 to the disc drive 120, a command bus 130, and a status bus 132. The disc drive 120 also contains a system microprocessor 134, the primary function of which is to receive, decode and execute commands from the host computer system 124. These commands are carried to the disc drive 120 by way of the command bus 130. A typical interface of this type may be a SCSI (Small Computer System Interface) Bus.

The SCSI Bus commands define the disc storage space in terms of LBAs. One of the functions of the system microprocessor 134 in the disc drive 120 is to convert these LBAs into a physical address on the disc. The physical address is defined by cylinder, head and sector. A cylinder is the radial position defined by a vertically aligned group of data tracks and a corresponding servo track. Selecting a head defines which of the data tracks in the cylinder will be accessed, and the sector defines the circumferential position on the track where the block of data to be transferred begins. Once the system microprocessor 134 has translated the LBA to a physical address, the seek to that address is initiated by a command passed to the servo microprocessor 96 on the command path 112 in FIG. 6. This command includes a physical address which the servo microprocessor 96 compares with the current position of the actuator derived from the servo data decode logic 94.

If the physical address requested by the system microprocessor 134 differs from the current cylinder, the servo microprocessor 134 initiates a seek to the desired cylinder and reports the completion of the seek to the system microprocessor 134 by way of an inter-processor status bus 136. Once the seek is completed, the system microprocessor 134 then selects the direction for data transfer based on the command received on the host interface 122. That is, if data is to be written onto the disc, the data received over the data bus 126 is passed to a data buffer 138 and then serially written to a disc 140 by way of an internal data bus 142. Completion of the transfer is signified to the host computer system 124 by way of the status bus 132 in the host interface 122. Conversely, if data is to be retrieved from the disc 140, it is serially read from the disc 140 via the internal data bus 142 into the data buffer 138. Notification of the availability of the data in the data buffer 138 is sent to the host computer system 124 via the status bus 132 and the data is then transferred to the host computer system 124 via the data bus 126.

Turning now to FIG. 5, shown is a block diagram of a typical high volume test system which can be used in the manufacture of disc drives such as those described hereinabove, and which is capable of performing the method of the present invention. The test system includes a plurality of host computer systems 124, typically commonly available personal computers or PCs, connected to each other and a network server 125 via a network bus 127. As is readily seen, each of the host computer systems 124 is connected via its host interface 122 to a plurality of disc drives 120 to be tested. In such a system, the network server 127 typically keeps track of overall system operations, such as throughput statistics, failure rates, etc., and would be especially useful in providing automated test performance information regarding the results of the test of the present invention. Control of specific testing tasks, however, lies within the host computer systems 124. Implementation of specific actions necessary to the performance of the testing tasks is carried out by the interaction of the host computer system 124, system microprocessor and the servo microprocessor, as will be described in detail hereinbelow.

It will also be apparent from FIG. 5 that, in a high volume manufacturing environment, it would not be economically feasible to provide a frequency analyzer costing thousands of dollars each to attach to each of the disc drives being tested. Similarly, it would be extremely inefficient from the point of view of time utilization to provide for a lesser number of frequency analyzers (for instance one per host computer system) and have the operator of the test system connect the frequency analyzer in turn to each individual drive, perform the necessary tests and disconnect the frequency analyzer and move it to the next unit to be tested.

Before continuing with a detailed description of the invention, it should be recalled that the present invention relies on an empirically derived correlation between certain specific mechanical defects in the disc drive and a susceptibility of the disc drive to resonance at a marker frequency. That is, over the history of manufacturing hundreds of thousands—and even millions—of identical disc drive units, a correspondence has been noted between drives with a specific mechanical fault and a tendency for those drives to resonate at a specific frequency. For instance, it has been determined that disc drive units of one design having a particular type of tilt between the actuator and the discs have been also found to be particularly susceptible to vibrations at approximately 1.1 kHz. Since this particular mechanical fault was also associated with early failure of the disc drive, it was advantageous to be able to screen for the mechanical fault by testing for resonance at the associated marker frequency. In this manner, the mechanical fault could be identified without the necessity of opening the sealed head/disc assembly and performing a detailed mechanical analysis. Further, it was found that other mechanical defects were reflected in the disc drives' susceptibility to resonance at other specific marker frequencies, and this relationship between mechanical defect and resonant frequency susceptibility forms the foundation on which the present invention is based.

Turning now to FIG. 6, shown is a general flow diagram of a program executed by the host computer system 124 as shown in FIG. 5, which would cause the system microprocessor 134 in the disc drive 120 to perform the steps necessary to implement the method of the invention. It should be recalled that the overall operation of the invention requires linked communication between the host computer system 124 and the system microprocessor 134 in the disc drive 120, as well as linked communication between the disc drive system microprocessor 134 and the disc drive servo microprocessor 96. That is, a system level command from the host computer system 134 causes the disc drive system microprocessor 134 to interpret the system level command and pass on to the disc drive servo microprocessor 96 a second set of instructions to which the servo microprocessor 96 responds by executing a specific sequence of physical steps and actions.

The flow diagram of FIG. 6 would be a small portion of the overall test sequence performed on disc drives during the manufacturing test operation. Since the present invention relates to the detection of mechanical defects in the disc drive, it would be logical if this test were performed before certain other long-running tests, such as electronic burn-in, thermal cycling, etc. In this way, early detection of the mechanical defects saves the time and resources needed for the long-term test operations.

When during the course of manufacturing the time comes to perform the method of the present invention, the host program enters its calling routine at a start point 500. The host computer system (124 in FIGS. 4 and 5) then issues a RESONANCE DETECTION TEST command via the host interface (122 in FIGS. 4 and 5) at step 502 and enters a loop at step 504 waiting for the disc drive (120 in FIGS. 4 and 5) to respond with a command complete via the status bus (132 in FIG. 4) which is a portion of the host interface 122. The actions initiated in the disc drive by the RESONANCE DETECTION TEST command will be described in detail below.

Once the host computer system 124 receives the command complete status from the disc drive for the RESONANCE DETECTION TEST command, the host computer system 124 drops out of the loop of step 504 and issues a READ TEST RESULTS command, again on the host interface 122, at step 506, and enters a second loop at step 508 waiting for the disc drive to indicate the completion of the READ TEST RESULTS command by passing the command complete status in the same manner noted above. This READ TEST RESULTS command causes the disc drive to read the results of the completed resonance test from an internal memory location and pass the results to the host computer system via the data bus (126 in FIG. 4) which also forms a part of the host interface 122. Once the command complete status is sent to the host computer system, the host computer system reads the data forming the result of the resonance detection test from the data bus 126 and stores this data in a memory location internal to the host computer system. The actions initiated in the disc drive by the READ TEST RESULTS command will be described in detail below.

Step 510 of the flow diagram of FIG. 6 is a very general step during which the host computer system evaluates the results obtained in step 506. The actual evaluation that occurs can vary greatly based on the specific resonance frequency being tested for in the disc drive, and the associated mechanical defect that the presence of resonance at the frequency represents. In general, though, such an evaluation could comprise the comparison of the numerical test result data to a pre-defined threshold value, and the establishment of a pass/fail criteria based on this comparison.

The evaluation of step 510 is followed in the host computer system by a pass/fail decision at step 512. If the evaluation of step 510 produced a "Fail" condition, the flow of FIG. 6 continues to step 514, where an error flag is set. The setting of this error flag could in turn lead to several actions which are in and of themselves not a part of the present invention. For instance, the setting of the error flag could result in the triggering of an audible alarm alerting the operator of the test system that one of the disc drives under test has failed. This in turn would be cause for the operator to take whatever steps are necessary to identify the specific failing disc drive, remove it from the test system, and replace it with another disc drive to be tested. The failed disc drive could then be sent to another location for either teardown and repair, reassembly, remanufacture or scrapping, whatever the manufacturer has determined to be the proper consequence of failure of the test. Further, the test results obtained in step 510 could be collected along with other diagnostic information and transferred along with the failed disc drive unit as an aid to reworking.

If, however, the evaluation of step 510 indicates a "Pass" condition, the flow of the program shown in FIG. 6 ends at step 516, which passes control of the host computer system to the next test in the manufacturing process.

Figure 7:
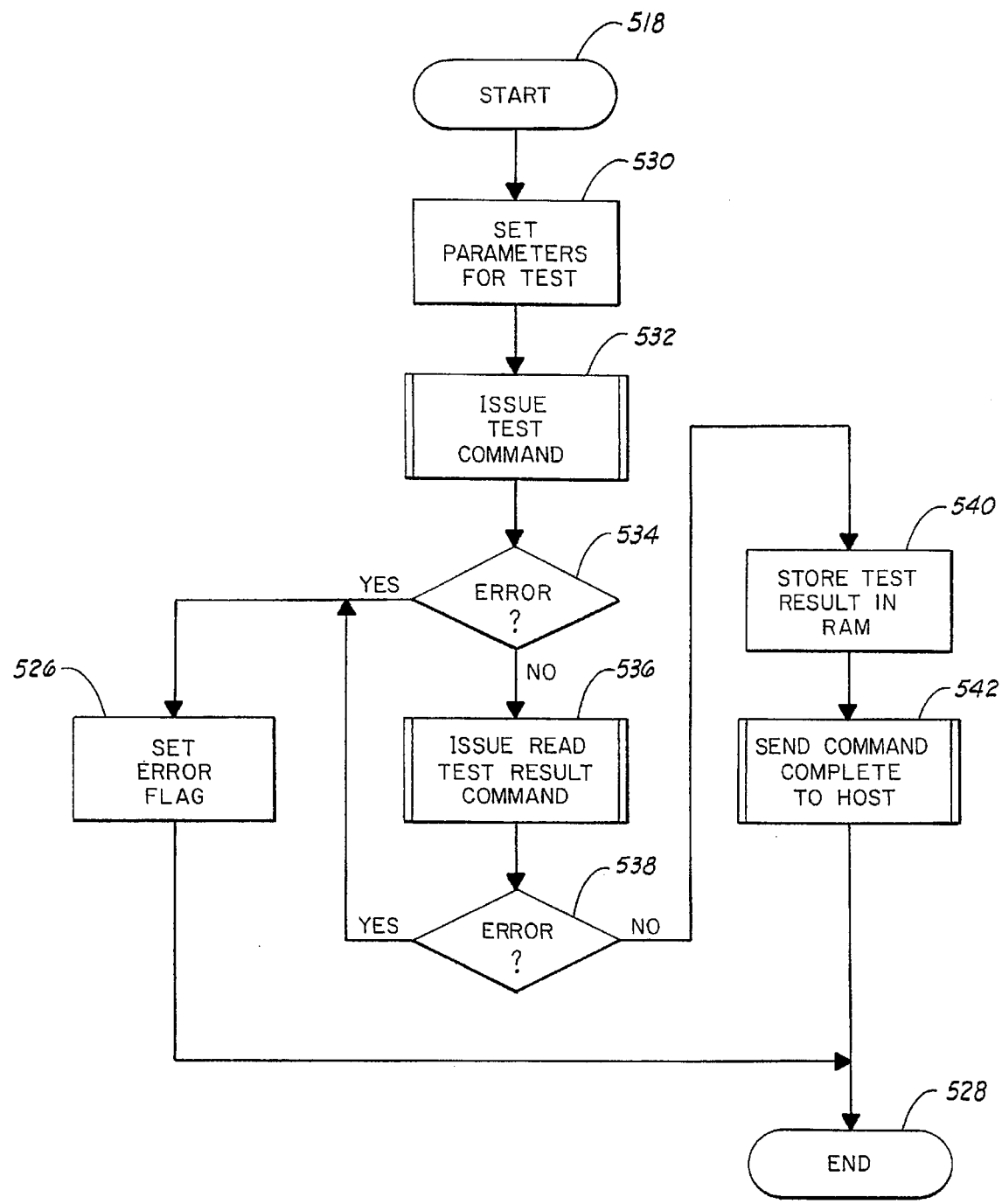
FIG. 7 is a flow diagram of the microprogram executed by the system microprocessor as a result of the execution of one of the commands of the program illustrated in FIG. 6.
Figure 9:
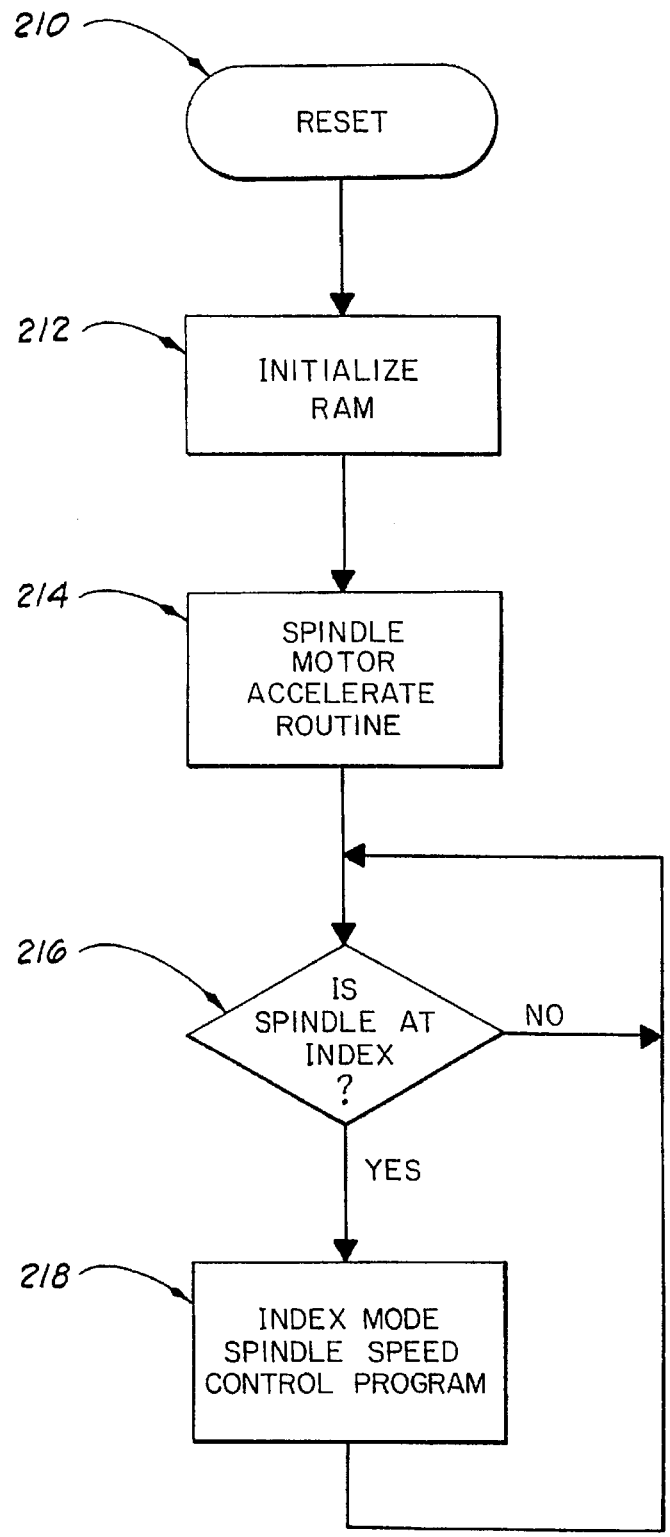

FIG. 7 is a flow chart of the program executed by the system microprocessor (134 in FIG. 4) in response to the receipt of the RESONANCE DETECTION TEST command from the host computer system (124 in FIG. 4) as previously discussed in relation to step 502 of the flow of FIG. 6. Once the system microprocessor has decoded the RESONANCE DETECTION TEST command, it enters the flow of FIG. 7 at the START step 518 and proceeds with step 530, which sets up the parameters for the TEST command to follow. The specific parameters initialized at step 530 will include the frequency and magnitude of a sinusoidal frequency to be injected into the servo position error (SPE) signal and any required delay prior to test data accumulation in order to allow spurious resonances to first settle. The selection and use of these parameters will be discussed more fully below.

After the TEST command is issued in step 532, the system microprocessor enters a decision box 534 where the system microprocessor checks for any error conditions which might have occurred in the servo microprocessor's execution of the system microprocessor's TEST command. As will be recognized, an error is flagged at step 526 for any error conditions experienced at this time and such error conditions will be reported to the host computer system.

If no errors are detected in the TEST operation, the flow chart of FIG. 7 continues at step 536 wherein the system microprocessor issues a READ TEST RESULT command to the servo microprocessor. Specific details of the actions of the servo microprocessor in response to the receipt of the READ TEST RESULT command will be discussed in detail below. For purposes of discussion of the system microprocessor operation, it is sufficient to note that the system microprocessor again checks for errors at step 538 and obtains the result of the test operation from the servo microprocessor via the interprocessor data bus (shown as bus 135 in FIG. 4) upon receipt from the servo microprocessor of a COMMAND COMPLETE status.

Once the system microprocessor has received the result of the test operation, it stores the result in its own internal RAM (98 in FIG. 4) at step 540 and notifies the host computer system that the command is completed and the test results are available by sending a COMMAND COMPLETE to the host computer system at step 542 via the host interface status bus (132 in FIG. 4).

The system microprocessor flow then ends at step 528 where control of the system microprocessor is returned to a routine awaiting another command on the host interface command bus (130 in FIG. 4).

It should be noted that a single RESONANCE DETECTION TEST command from the host computer system (step 502 of FIG. 6) initiated the entire course of action shown in the flow diagram of FIG. 7, which in turn includes the interaction of three commands between the system microprocessor and the servo microprocessor.

Figure 8:
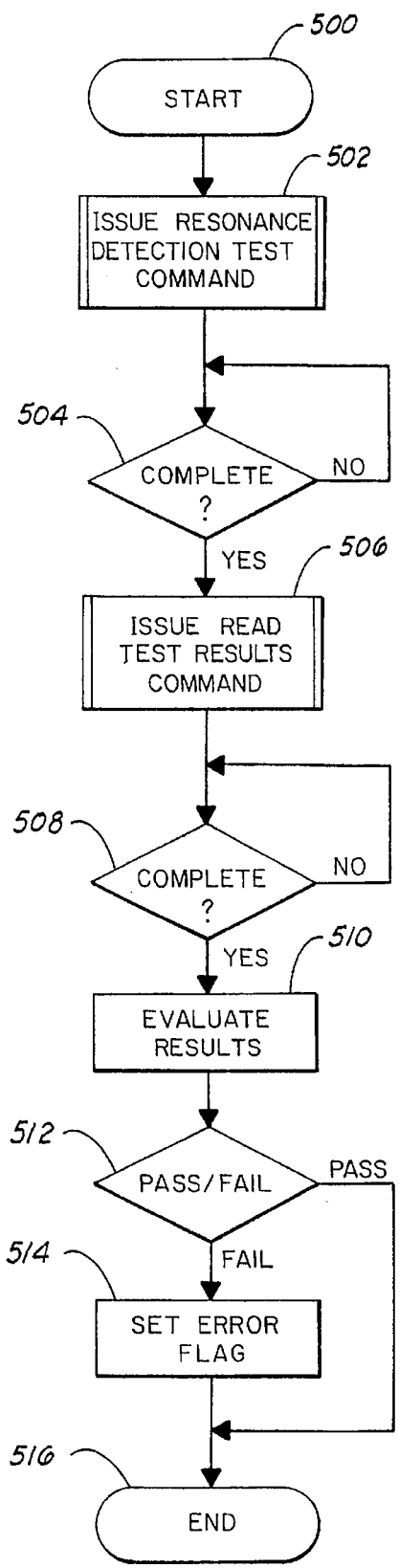
FIG. 8 is a flow diagram of the microprogram executed by the system microprocessor as a result of the execution of a second of the commands of the program illustrated in FIG. 6.

FIG. 8 shows a flow diagram of the actions initiated in the system microprocessor when the host computer system issues the READ TEST RESULTS command (FIG. 6, step 506). After the system microprocessor has decoded and recognized the READ TEST RESULTS command, program flow passes to the flow diagram of FIG. 8 at START step 544. The system microprocessor, which received the test results from the servo microprocessor in step 540 of FIG. 7, then reads the test results out from its internal RAM at step 546, outputs the result onto the host interface data bus at step 548 and sends a COMMAND COMPLETE status to the host computer system via the host interface status bus at step 550. The operation requested by the host computer system being completed, the program flow for this system microprocessor then ends at step 552.

Figure 9:
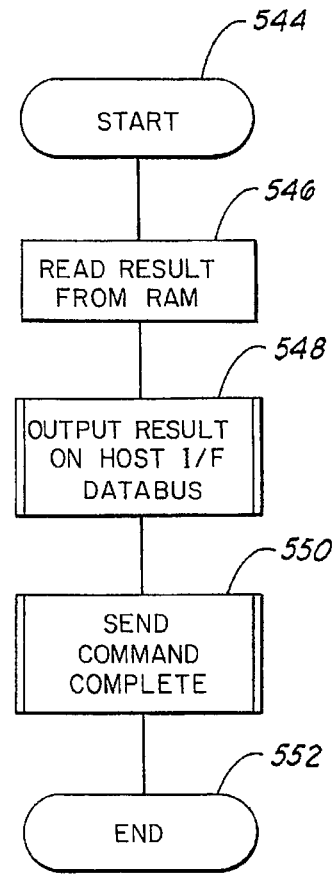
FIG. 9 is a flow diagram of the main microprogram executed by the servo microprocessor of the servo system of FIG. 2.

The clearest way of showing the interrelationship between the operation of the system microprocessor 134 (as shown in FIG. 4) and the servo microprocessor 96 is through the use of flow charts. FIG. 9 provides a simplified flow chart of the main program executed by the servo microprocessor 96. The servo microprocessor 96 is reset at power on in step 210, initializing the hardware and setting it to a desired known condition. The servo microprocessor RAM 98 is initialized at step 212, and the servo microprocessor 96 then enters a routine to accelerate the spindle motor from rest to its specified operating speed in step 214. Once the spindle motor has reached its nominal operating speed, the servo microprocessor 96 enters a simple loop program checking for the index signal to be decoded by the servo data decode logic 94 in decision block 216, and when index has been detected, running an index mode spindle speed control program at step 218 to maintain the spindle motor at the desired speed. All other operations of the servo microprocessor are accomplished through the use of interrupts to the servo microprocessor 96.

Figure 10:
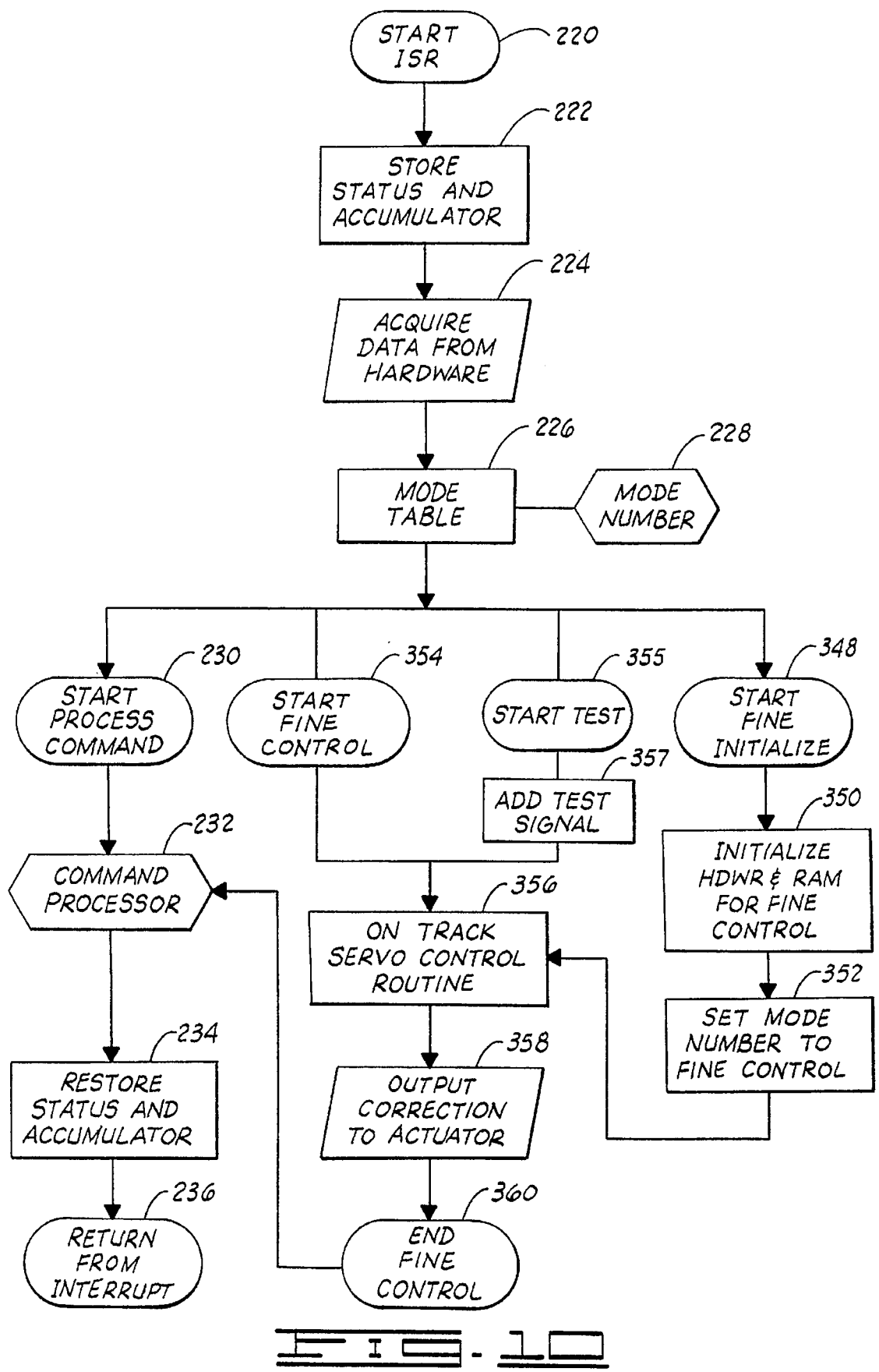
FIG. 10 is a general flow diagram of the top level interrupt service routine executed by the servo microprocessor of the servo system of FIGS. 2 and 4.

FIG. 10 shows a portion of the main interrupt service routine (ISR) for the servo microprocessor 96. It will be understood that this is not a comprehensive flow chart for all functions performed by the servo microprocessor 96, but it does summarize the functions that the servo microprocessor 96 performs in the steps of the present invention. It should be recalled that interrupts are sent to the servo microprocessor 96 on a constantly recurring basis, once the spindle motor 84 has reached operating speed, as a function of the servo loop 90 (as described hereinabove with reference to FIGS. 2 and 4). Specific generation of the interrupts and the timing used for this generation is explained in detail in the previously incorporated U.S. Pat. No. 5,262,907. For purposes of this discussion, however, it is sufficient to note that an interrupt is sent to the servo microprocessor 96 once for each servo frame 102 (as shown in FIG. 3), at a time after the address, position, and sector fields have been decoded by the servo data decode logic 94. This results, in the specific application of the incorporated reference U.S. Pat. No. 5,262,907, in an interrupt occurring about every 42 microseconds.

Referring now to FIG. 10, the interrupt service routine executed by the servo processor starts at a block numbered 220. The servo microprocessor 96 contains an accumulator which is the working register for mathematical and logical operations and a status register which defines several internal conditions for the program being executed. Because the servo microprocessor 96 does not automatically store the accumulator and status register in response to an interrupt, the accumulator and status registers are saved as a first step 222 in the ISR. Next, several different types of information, such as the track address, actuator drive current, servo position error (SPE), presence of index, etc. are collected from the servo system and stored away in the servo microprocessor RAM at step 224. At this time, the specific interrupt to be serviced has not been identified and it is faster to simply store this information for every interrupt than to determine the reason for the interrupt and then collect the data necessary to service the interrupt. The ISR then selects the starting address of the proper service routine from a mode table at step 226, based on a mode number supplied by, block 228. This mode number may be determined by the previously executed interrupt routine, or preset at power up. Assuming that this is the first interrupt after power application, the mode number points to the element of the mode table that supplies the starting address of the routine identified as "START PROCESS COMMAND" at block 230. This routine again involves a number of choices at block 232 the "COMMAND PROCESSOR", but before examining these choices, it should be noted that the flow diagram indicates that no matter what actions the COMMAND PROCESSOR initiates, the ISR returns to this point to finish servicing the interrupt, as do all other routines selected by the look up of the mode table at step 226. As FIG. 10 shows, the final steps in servicing all interrupts involves restoring the status register and accumulator at step 234 and exiting to the previously interrupted program at step 236.

Figure 11A:
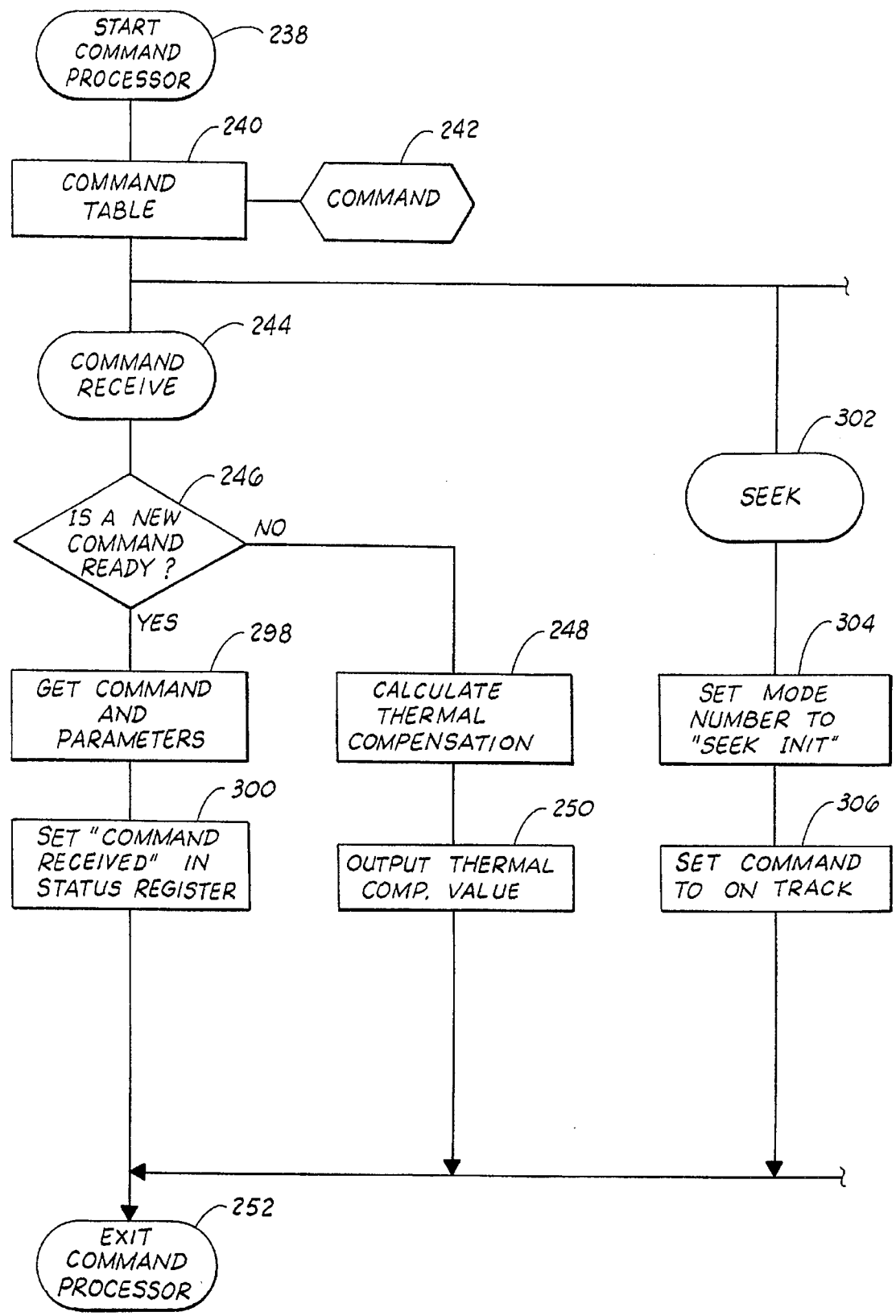
Figure 10:
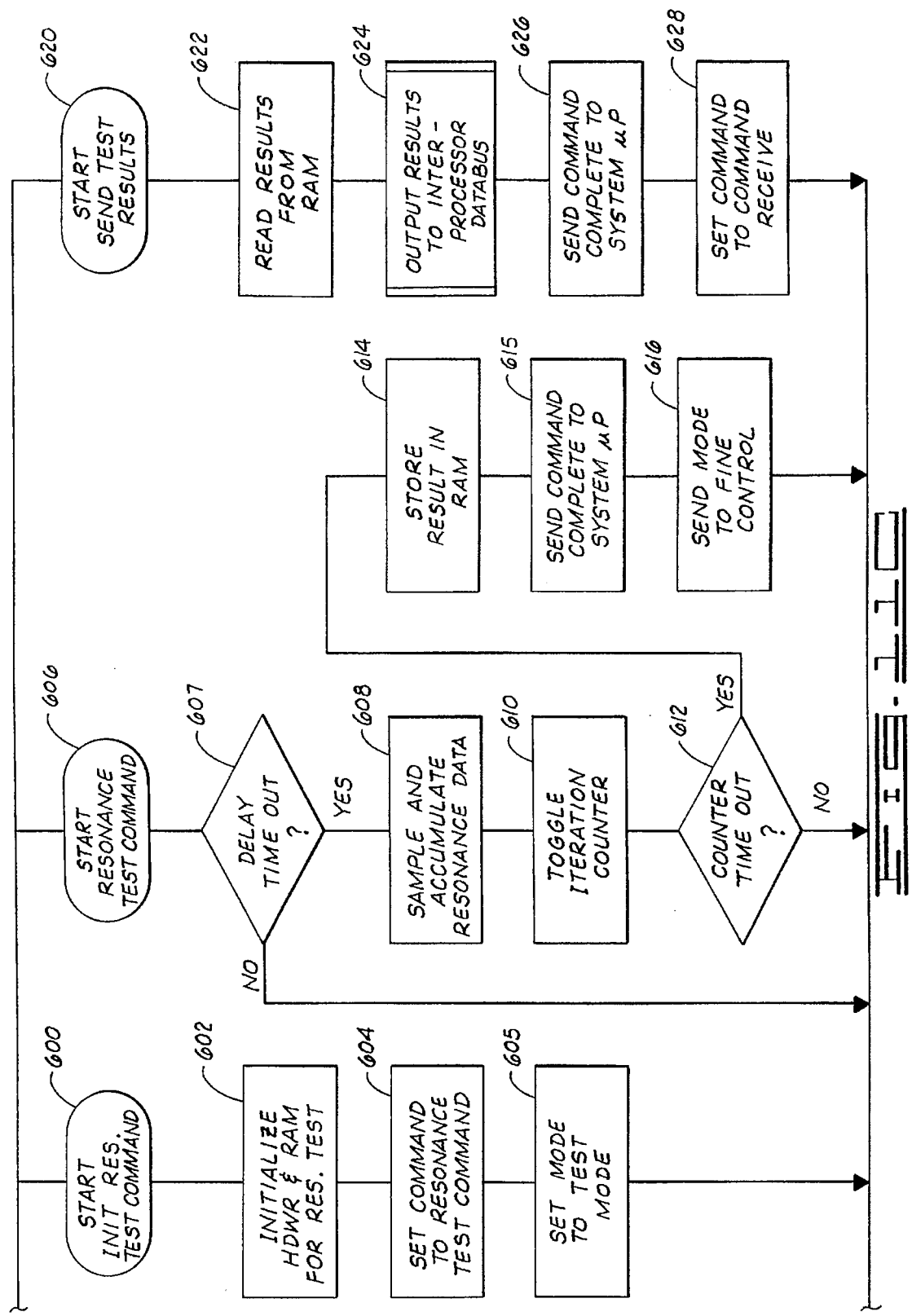

The operation of the COMMAND PROCESSOR is shown in the flow diagram of FIGS. 11A through 11C, which are only a partial flowchart of all the options that may be executed by the COMMAND PROCESSOR, but includes the choices necessary to define the present invention. The flow chart begins at step 238, and the subsequent path for the interrupt service is determined by selecting a starting address for the next program to be executed from a COMMAND TABLE at step 240. The specific address to be selected is determined by the COMMAND block 242. Once again, the COMMAND may be selected by a previously executed Command Process, or preset to a default value at power on. Once again, assuming that this is the first interrupt after power on, the COMMAND block 242 selects the starting address of the COMMAND RECEIVE routine which begins at block 244 from the COMMAND TABLE step 240. The COMMAND RECEIVE routine first checks to see if a command has been received from the system microprocessor 134 (FIG. 4) at step 246. If no such command has been received, the servo microprocessor calculates a thermal compensation factor at step 248, transfers this compensation factor to the portion of the microprogram which controls actuator drive current at step 250 and exits the COMMAND PROCESSOR flow at step 252. It should be recalled that this exit returns program flow to step 234 of FIG. 10, where the status register and accumulator are restored and the ISR is terminated at step 236. This path, steps 220 through 232 (of FIG. 10), 238 through 252 (FIG. 11A), and 234 to 236 (FIG. 10), continues to be selected for each interrupt until a command is received by the servo microprocessor 96 from the system microprocessor 134.

It is important to recall at this time that the test method of the present invention involves the intentional injection of a sinusoidal signal of known frequency and magnitude into the servo position error (SPE) signal while the disc drive is in a track following mode and characterizing the resultant signal on the SPE in order to detect any resonances induced by the disc drive structure. Because the test is performed during a track following mode of operation, further discussion of disc drive "seeks" will be omitted from the present discussion, although the disc drive will obviously be capable of performing such seeks. For reference, the previously mentioned and incorporated by reference co-pending U.S. patent application Ser. No. 08/499,388 entitled "TESTING FOR MECHANICAL DEFECTS IN A DISC DRIVE USING DETECTED RESONANT FREQUENCIES" provides a detailed discussion of the steps performed by the disc drive during a seek.

Before providing further description of the steps involved in the present invention, it may first be helpful to briefly describe the operation of the disc drive in its track following mode prior to receipt of a TEST command from the host computer system (124 of FIGS. 4 and 5). As provided in FIG. 10, at such time that the disc drive is instructed to enter the track following (or FINE CONTROL) mode, a START FINE INITIALIZE mode is selected which passes program control (as illustrated in FIG. 10) to block 348, START FINE INITIALIZE, after which the hardware and RAM are initialized for FINE CONTROL at step 350 and the mode number is set to FINE CONTROL at step 352. It is important to note that the next time through the ISR of FIG. 10 will cause program flow to enter the FINE CONTROL mode of steps 352 through 360, and this will continue until a new mode (such as an instruction to perform a seek) is received.

Continuing with the START FINE INITIALIZE routine, the program flow of FIG. 10 shows the next step at 356 wherein an ON TRACK SERVO CONTROL routine is selected. Briefly, FIG. 11B illustrates the ON TRACK routine at steps 362 through 368, wherein the velocity and position of the head are measured in step 364, the head is checked to see whether it is on track center at step 366, and if so, the CHECK TRACK command is set at step 368. Thus, this routine serves to ensure the head remains centered on the selected track. When program flow continues through the COMMAND PROCESSOR at the next interrupt, the CHECK TRACK routine of steps 370 through 378 of FIG. 11B is subsequently performed which ensures the actuator is on the selected track. For reference, a more detailed description of the operation of the disc drive while in FINE CONTROL mode is provided in previously mentioned and incorporated by reference U.S. Pat. No. 5,262,907, but the description provided hereinabove in conjunction with the process flows are sufficient for an understanding of the test of present invention, which will now be discussed.

The present invention can perhaps be best understood by following the servo processor flows as they would by called by the system processor flows discussed above in relation to FIGS. 7 and 8. Returning briefly to FIG. 7, it can be seen that the first command issued by the system microprocessor to the servo microprocessor is the TEST command at step 532. As shown in FIG. 11A, when the system processor instructs the system to perform the test, the TEST command and associated parameters (discussed more fully hereinbelow) are read by the servo microprocessor at step 298 and a "command received" bit is set at step 300 in the status register of the servo microprocessor of the receipt of the command. Because at the termination of the previous interprocessor action, the flow diagram of FIG. 10 was left in the FINE CONTROL mode, at the next interrupt, the COMMAND PROCESSOR is again called at step 232, but the decoding of the TEST command at 242 selects the starting address of the INITIALIZE RESONANCE TEST command routine from the COMMAND TABLE step 240, which passes program control to the START INIT RESONANCE TEST routine at step 600 of FIG. 11C. At step 602, the hardware and RAM are initialized in order to perform the resonance test of the present invention. This initialization includes the setting of an iteration counter, the selection of the particular frequency-dependent variables for the resonance test and the selection of an amount of delay required prior to the accumulation of the test data. The servo microprocessor continues to operate at step 604, wherein the COMMAND PROCESSOR logic is set to select the starting address of the RESONANCE TEST command upon receipt of the next interrupt. Step 605 is next entered wherein the mode is set to TEST MODE and program flow passes through the RESTORE STATUS AND ACCUMULATOR step 234 and RETURN FROM INTERRUPT at step 236 (both of FIG. 10).

Discussion will now be directed to the steps necessary to characterize the resonant frequency or frequencies induced in the disc drive structure. Upon receipt of the next interrupt, the program flow of FIG. 10 passes through the START TEST block 355 and a digital value representative of the test signal is added to the SPE in block 357. This digital value will be described in more detail below, but it should be noted that the value is generated from a sine table in RAM and serves to add the desired test frequency to the SPE in order to perform the test of the present invention. It should also be noted that the remaining steps in the TEST routine beginning at block 355 are the same as normal FINE MODE control, except for the intentional injection of the test signal.

As previously instructed by step 604 of FIG. 11C, the COMMAND PROCESSOR selects the starting address of the RESONANCE TEST command and program flow enters step 606 of FIG. 11C and proceeds to step 607, wherein a delay counter, as initialized in step 602 of the INITIALIZE RESONANCE TEST routine, is queried. As previously mentioned above, the test may use an initial delay to allow for spurious resonances to settle before sampling and accumulation of resonance data takes place. At such time that the delay has timed out, on the next pass through the RESONANCE TEST routine the program flow will continue to step 608, wherein resonance data is sampled and accumulated from the SPE. As a number of samples will be obtained and accumulated in order to detect and characterize the presence of the test resonant frequency, the iteration counter previously initialized in step 602 is toggled at step 610 and a decision is made in step 612 as to whether the desired number of iterations of the test sample and accumulate has occurred. In other words, the iteration counter is initially set to reflect the desired number of passes through the RESONANCE TEST flow during which data will be sampled and accumulated, and during each pass through the flow a sample and accumulate operation occurs at step 608 on the SPE and the iteration counter is toggled (i.e., incremented or decremented as implemented) until the desired test duration is completed. It has been found that, for example, 64 such sample and accumulation operations have been adequate for certain resonant frequency detections and characterizations.

Once the desired test duration is completed, the result of the test is stored in the servo microprocessor RAM at step 614, a COMMAND COMPLETE is sent to the system microprocessor at step 615 and the mode control logic is set to select the FINE CONTROL mode at step 616 for the next interrupt. An example of a useful sample and accumulate operation for step 608 will be described in more detail below. It is important to note, however, that the specific sampling and accumulation methodology employed in order to detect and characterize the presence of resonant frequencies should not be considered limiting to the scope of the present invention, as it will be recognized by those of skill in the art that several such methodologies may be available and useful in detecting and characterizing the presence of a particular frequency within a signal.

Returning now to the system microprocessor flow of FIG. 7, it should be recalled that the servo microprocessor operations described immediately above occurred as a result of the TEST command issued by the system microprocessor to the servo microprocessor at step 532, and that the TEST command is only a single step in the logical flow of operations executed by the system microprocessor in response to the RESONANCE DETECTION TEST command of step 502 of the host computer system flow diagram of FIG. 6.

In FIG. 7, it will be recalled from the previous discussion hereinabove that the system microprocessor flow continues at step 536 in order to complete the system level RESONANCE DETECTION TEST command. In step 536, the system microprocessor issues the READ TEST RESULT command and once again checks for errors at step 538. The actions of the servo microprocessor in response to the READ TEST RESULT command will now be described.

Turning first to the COMMAND PROCESSOR flows of FIGS. 11A through 11C, it will be recalled that the termination of the previous servo microprocessor operation left the COMMAND PROCESSOR in the COMMAND RECEIVE mode, looping through steps 246 through 252 (and performing thermal calibrations), while the mode portion of the servo microprocessor ISR was left in the FINE CONTROL mode, looping through steps 354 through 360 (of FIG. 10A) and calling the COMMAND PROCESSOR with each interrupt (at step 232 of FIG. 10A).

Now, when the READ TEST RESULT command is received by the servo microprocessor the COMMAND RECEIVE flow gets the new command and parameters at step 298 of FIG. 11A and sets the COMMAND RECEIVED status in the status register at step 300 to notify the system microprocessor that the command has been received and recognized. On the next pass through the COMMAND PROCESSOR, the decoding of the READ TEST RESULT command forces the command logic at step 242 to select the starting address of the SEND TEST RESULTS flow from the command table at step 240 in FIG. 11A and program control is passed to the START SEND TEST RESULTS block 620 on FIG. 11C. At step 622, the servo microprocessor reads the results previously stored in step 614 from the RAM and at step 624 outputs these results to the interprocessor data bus 135, as shown in FIG. 4. The servo microprocessor then sends the COMMAND COMPLETE to the system microprocessor at step 626 which will, in turn, notify the system microprocessor to read the results from the interprocessor data bus 135. The servo microprocessor flow then continues at step 628 wherein the command code is set to COMMAND RECEIVE for the next interrupt.

Returning now to FIG. 7, the completion of the READ TEST RESULT command causes the flow to continue at step 540 where the test results are stored in the system microprocessor RAM (133 as shown in FIG. 4). Then, at step 542 of FIG. 7, the system microprocessor sends the COMMAND COMPLETE status to the host computer (124 in FIG. 4) via the host computer system status bus 132. This completes the system microprocessor and servo microprocessor operations required for the system level RESONANCE DETECTION TEST command issued by the host computer system at step 502 in FIG. 6.

As shown in FIG. 6, the host computer system 724 proceeds at step 506 to request the results of the RESONANCE DETECTION TEST command by issuing READ TEST RESULTS command. This causes the system microprocessor to enter the flow diagram of FIG. 8, which, as it will be recalled, reads the test results from RAM at step 546, outputs the results on the host interface data bus at step 548, and notifies the host computer system of the availability of the test results on the host interface data bus by sending the COMMAND COMPLETE status at step 550. Once the host computer system has retrieved the test results from the system microprocessor RAM, these results are evaluated at step 510 of FIG. 6, and the pass/fail decision is made based upon this evaluation as previously described hereinabove.

Figure 12:
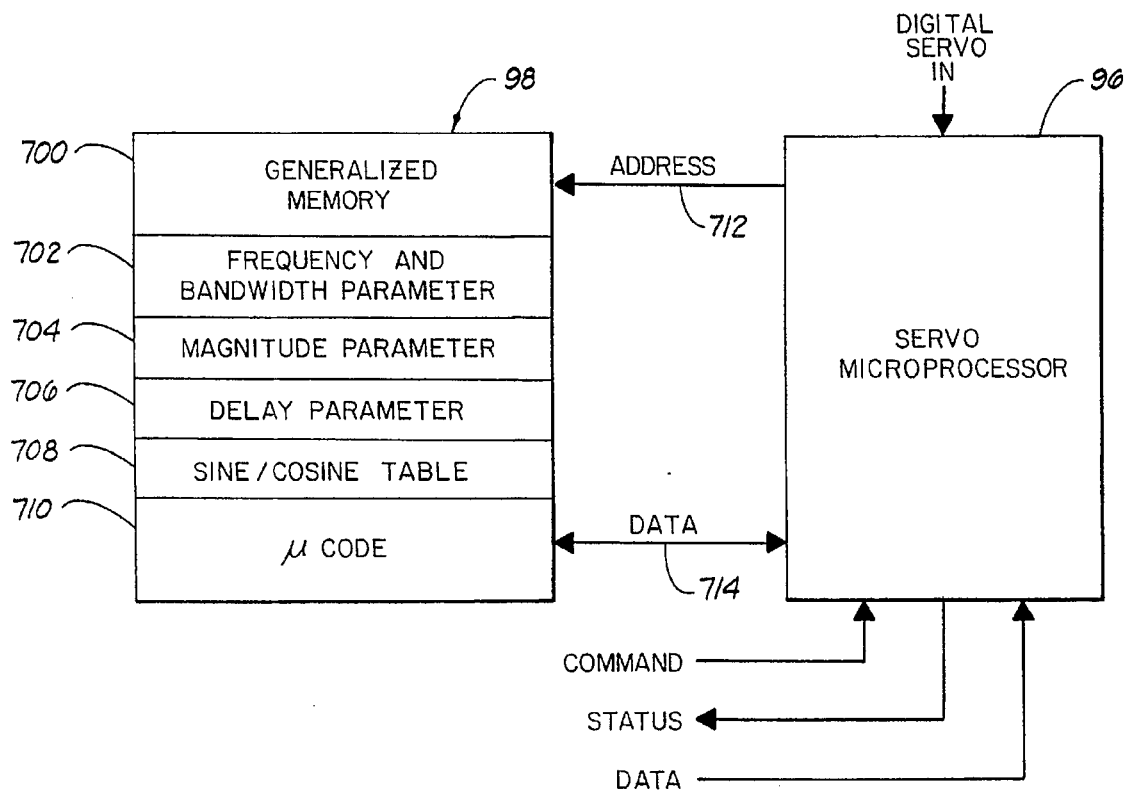
FIG. 12 is a block diagram showing the servo microprocessor of FIGS. 3 and 5 and the organization of its internal RAM as it relates to the present invention.

Turning now to a discussion of the injection of the test signal (as described hereinabove with reference to step 357 of FIG. 10), FIG. 12 provides a block diagram of the servo microprocessor 96 and associated RAM 98 (previously described in FIGS. 2 and 4) including a generalized memory map of the RAM 98. As shown in FIG. 12, the RAM 98 includes several portions to which memory is allocated, including a generalized memory portion 700, a frequency and bandwidth parameter 702, a magnitude parameter 704, a delay parameter 706, a sine/cosine table 708 and a microcode portion 710. It will be noted that these portions are shown by way of illustration only to facilitate the present discussion and may not correspond to the actual percentage of RAM actually required by each portion. It will also be noted that access to these portions by the servo microprocessor 96 can be accomplished by way of an internal address bus 712 and an internal data bus 714, both of which reside internally in the servo microprocessor 96.

Beginning with the generalized memory portion 700, it will be recognized that this portion provides the ordinary storage requirements of the servo microprocessor 96 during operation, including the storage of commands provided by the system microprocessor and the storage of the test results obtained by the RESONANCE TEST routine of FIG. 11C. The frequency and bandwidth parameter 702 provides a table whereby, as described below, the frequency of the desired test signal to be injected can be selected. The magnitude parameter 704 likewise enables the magnitude of the injected signal to be selected. The delay parameter 706 provides a table whereby the desired delay may be selected prior to initiating the sample and accumulate step 608 of FIG. 11C.

The sine/cosine table 708 provides a digital representation of a sinusoidal waveform over 1 and ¼ cycles (450 degrees) and includes a sine pointer and a cosine pointer (not designated in FIG. 12), both of which continuously loop through the waveform during operation, allowing a continuous sinusoidal waveform to be outputted as required. Finally, the microcode portion 710 contains the resident servo microprocessor microcode.

Figure 13:
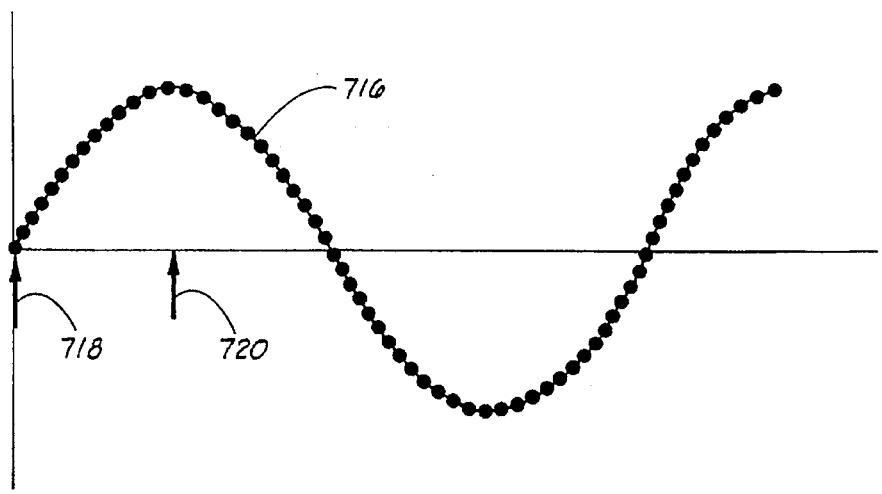
FIG. 13 is a diagrammatic representation showing how the values stored in the servo processor RAM of FIG. 12 are related to generation of sine and cosine values used by the present invention.

To further explain how the test frequencies injected into the SPE are generated and scaled, FIG. 13 is provided which shows a sinusoidal waveform 716 over 1 and ¼ cycles (450 degrees). The RAM contains a sampled, digitized representation of the waveform 716 with 66 sample points per cycle. As is shown, the waveform 716 begins at 0 degrees, so that initialization of sine pointer 718 at the first sample point and continuously cycling thereafter provides a digitally represented sine wave output. Cosine pointer 720, which is advanced 90 ahead of the sine pointer 718, begins at 90 degrees so outputting the digital values from the cosine pointer results in the outputting of a digitally represented cosine wave.

The purpose of the sine/cosine table 708 (of FIG. 12) is to provide a standard sinusoidal signal available for output and the frequency and bandwidth parameter 702 (of FIG. 12) modifies the frequency (and test bandwidth) of this sinusoidal signal as required. More particularly, as shown in FIG. 13, it is clear that setting the cosine pointer 720 to sequentially output each data point on the waveform 716 would result in a first cosine wave output at a relatively low (base) frequency; however, setting the cosine pointer 720 to output every other data point on the waveform 716, thereby skipping every other data point, would result in the outputting of a cosine waveform that is twice the frequency of the first cosine wave output. The present invention takes advantage of the ability to skip data points on the waveform 716; particularly, one portion of the frequency and bandwidth parameter 702 provides instructions for the cosine pointer 720 in terms of how many data points to skip as the cosine pointer 720 loops through the sine/cosine table 708. It will be recognized that as the number of data points that are skipped by the cosine pointer 720 is increased, the resultant frequency of the output will likewise increase. In the preferred embodiment, five selected bits in the frequency and bandwidth parameter 702 are used to indicate the number of data points to skip, from 0 to 31, so that the frequency may be increased to a value 31 times the base frequency. Thus, ignoring the effects of averaging (to be described below), in the preferred embodiment test frequencies of a digitally represented cosine wave can be incrementally generated from DC to about 11 KHz, in increments of about 360 Hz.

The frequency and bandwidth parameter 702 further provides for averaging of SPE samples as required prior to performing the sample and accumulate step 608 of FIG. 11C. It will be recognized that if no averaging takes place, then every SPE value will be sampled by the sample and accumulate step, but a number of consecutive SPE values, such as every two SPE values, may be averaged together and the resulting average could have the sample and accumulate step performed thereon. Such averaging will automatically filter out any high frequency components above half the Nyquist frequency, preventing them from being aliased down below half this frequency and showing up as a false reading. This averaging thus allows for narrower bandwidths and resulting increased precision in frequency determination, but also provides a resulting lower Nyquist frequency. As a result, the frequency and bandwidth parameter 702 also includes bits that indicate the number of SPE samples (whether 1, 2, 4, 8 or 16) to average before performing the sample and accumulate operation. FIG. 14 provides a table showing an example of some of the resultant frequencies and bandwidths that may be tested in the preferred embodiment of the present invention as a result of the use of the frequency and bandwidth parameter 702.

As will be noted in the table of FIG. 14, selection of the desired frequency and bandwidth parameter 702 results in the outputting of a digital representation of a cosine waveform at the desired frequency and bandwidth. It should be recalled that the frequency and bandwidth parameter 702 includes both the frequency information in terms of instructing the cosine pointer 720 how many data points in the waveform 716 of FIG. 13 to skip (indicated by the NO. OF SKIPPED DATA POINT column) and the bandwidth information in terms of how may SPE values to average (indicated by the SPE AVERAGE columns). It can readily be seen that a wide variety of resonant frequencies can thus be tested for, even low frequencies below the spindle rate.

The next parameter to be discussed is the magnitude parameter 704 (as identified in FIG. 12), which determines the magnitude of the resultant cosine waveform output as a result of the frequency and bandwidth parameter 702. Although it will be recognized that several methodologies may be employed to set the magnitude, in the preferred embodiment the sine/cosine table 708 contains 16 bit values for each data point and each value is placed in a 32 bit accumulator in the servo microprocessor and shifted to the left as required in order to set and control the magnitude of the resultant cosine waveform output.

Now that the particulars concerning the generation of the test signal have been discussed, we will now turn to a discussion of the SAMPLE AND ACCUMULATE RESONANCE DATA operation as described hereinabove with reference to step 608 of FIG. 11C. A Discrete Fourier Transform (DFT) has been found to be particularly useful in detecting and characterizing a resonant frequency induced into the actuator as a result of the injection of the test signal. As will be recognized by those of skill in the art, a DFT is a sampling methodology that involves the accumulation of the following values:

$$A = \sum_n (SPE(n)) \times (\sin(nK)) \qquad (1)$$

$$B = \sum_n (SPE(n)) \times (\cos(nK)) \qquad (2)$$

where
n=number of samples over which DFT is taken
SPE(n)=value of SPE at sample n
K=a constant,
f=test, or filtering frequency
T=sample period By selecting the number of samples n and the resonance frequency desired for detection and characterization, the values A and B above can thus be determined. Upon the calculation of the values A and B, the magnitude of the resonant frequency identified in the SPE signal can be determined as:

$$\text{magnitude=square root of } (A^2+B^2) \qquad (3)$$

and the phase of the resonant frequency can be determined as:

$$\text{phase=tan}^{-1}(A/B). \qquad (4)$$

It will be noted that the foregoing description of the present invention including the use of a DFT is by way of example rather than of limitation, in that it will be recognized that there are other possible data manipulation methodologies available that could be used to implement the sample and accumulate portion of the method of the present invention.

Figure 15:
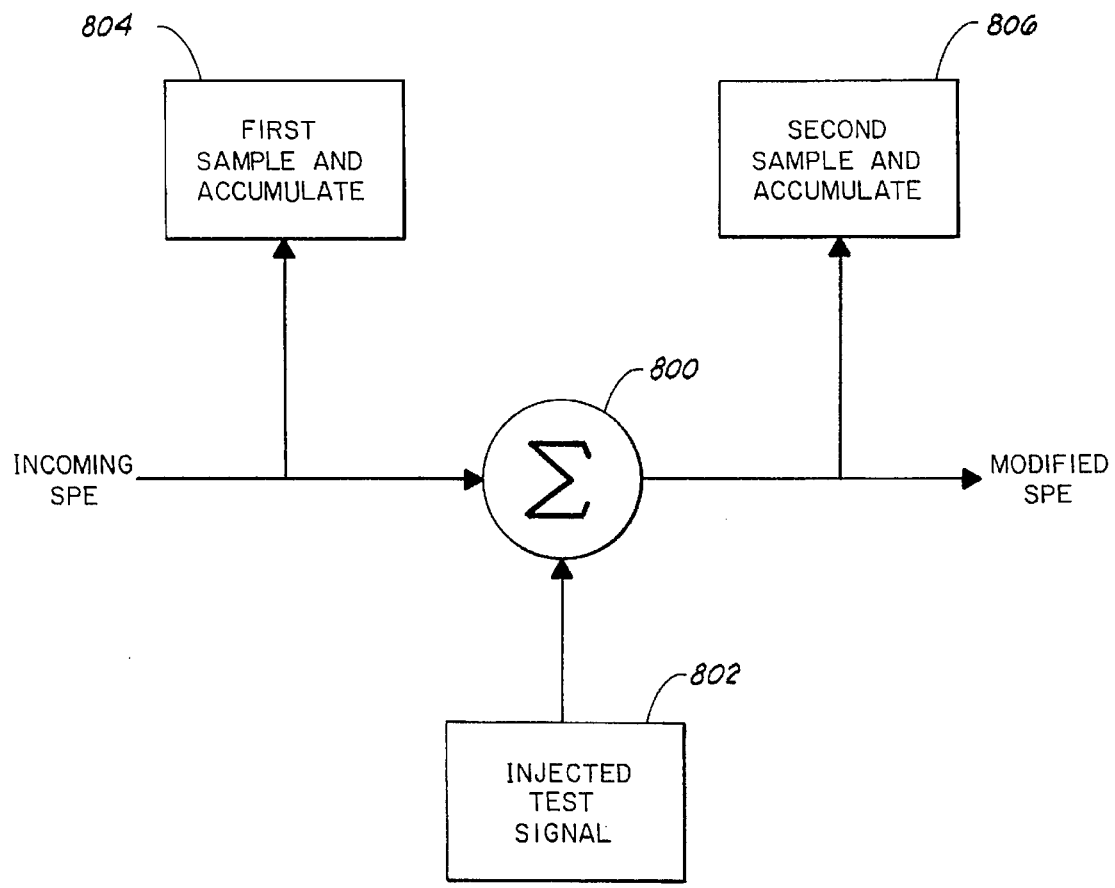
FIG. 15 is a functional block diagram illustrating the injection of the test signal and the sample and accumulate operations performed on the incoming SPE and the modified SPE.

Turning now to FIG. 15, shown therein is a simplified functional block diagram illustrating the injection of the test signal into the SPE and the evaluation that takes place in accordance with the present invention. It will be recalled that briefly, in accordance with the diagram of FIG. 2, the servo control circuit includes a "loop" comprising an SPE signal coming from the transducer head 78A, through the preamplifier 92, the servo data decode logic 94 and finally, to the servo microprocessor 96 (in digitized form), and a correction signal is passed from the servo microprocessor 96 to the VCM control circuit 100 and back to the actuator coil 74. As previously discussed, the present invention injects a sinusoidal test signal of known magnitude, phase and frequency into this "loop" at the servo microprocessor and performs a sample and accumulate operation to characterize the effect of this injected test signal in the loop. FIG. 15 illustrates a summing junction 800 that is represented to exist within the servo microprocessor, and through which the test signal is added to the incoming SPE signal by way of injected test signal block 802. Additionally, it will be noted that a sample and accumulate operation is performed both on the incoming SPE prior to the injection and to the modified SPE after the injection of the test signal. More particularly, a first sample and accumulate block 804 denotes the sample and accumulate operation on the signal received by the servo microprocessor 96 before the injection of the test signal at the summing junction 800, and a second sample and accumulate block 806 denotes the sample and accumulate operation on the modified SPE signal after the test signal has been added to the SPE. Both the first and the second sample and accumulate blocks 804, 806 use a methodology (such as the DFT described above) to characterize the frequency within the loop, and then a comparison is made between the two resultant characterizations in order to determine the presence of resonance in the system.

It can be seen that, once the sample and accumulate operations 804, 806 have been performed, a first frequency characterization (herein denoted as "DFT1") will have been obtained by the first sample and accumulate block 804 and a second frequency characterization (herein denoted as "DFT2") will have been obtained by the second sample and accumulate block 806. Because the servo loop is a closed loop, the gain of the loop can thus be determined by:

$$\text{gain} = \frac{\text{magnitude of } DFT1}{\text{magnitude of } DFT2} \quad (5)$$

It follows that any significant increase in localized gain in the system will likely be due to resonances induced in the disc drive structure as a result of the injected test signal; in other words, if the gain at a selected test frequency is greater than the gain at both adjacent test frequencies and above a set threshold, the control loop may contain a natural resonance at the selected test frequency.

Because, however, noise may sometimes contribute to a detected local peak in the gain, it may be helpful to also examine the phase shift (if any) between the measurements DFT1 and DFT2. The phase shift of the loop may be determined by:

$$\text{phase shift} = \text{phase of DFT1} - \text{phase of DFT2} \quad (6)$$

with the phase of DFT1 and the phase of DFT2 determined in accordance with equation (4) above.

Thus, if a peak is detected in the magnitude of the gain of the system at a particular test frequency, it may be helpful to also look at the phase shift at the test frequency to see if a discontinuity occurs in the phase shift (such as localized peak or a phase shift of 360 degrees) also occurred at or close to this test frequency. Such an additional evaluation would be useful in distinguishing between noise and true resonances within the disc drive.

By way of example, let it be assumed that a disc drive of the present invention has the aforementioned 1.1 KHz resonant frequency defect that was found to correlate to an actuator tilt defect in a disc drive. To initiate the test, the disc drive 120 would be instructed to begin the test sequence (as hereinabove described) and, after initialization of the test parameters, including the amount of delay required prior to the sample and accumulate operations, and the particular frequency and bandwidth parameter to use, the desired magnitude and the number of samples (65 have been found useful) the disc drive would initiate the test sequence, which would comprise the injection of the first test frequency (as illustrated in FIG. 14), the determination of the DFT1 and DFT2 values at that test frequency, and then a calculation of the gain (in accordance with equation (5) above) and phase. The test would continue with each additional frequency, until the desired number of test frequencies had been completed.

It should be noted that, generally, a particular frequency and bandwidth parameter 702 would be selected which then would result in a total of 32 frequencies being tested as the frequency and bandwidth parameter is incremented by the servo microprocessor. Such utilization of parameters for this purpose is well within the scope of those skilled in the art so no additional discussion will be provided herein. Later in the execution of the host computer program of FIG. 6 at step 506, wherein a READ TEST RESULTS COMMAND was issued by the host computer system 124 (as described hereinabove), the values of would be reported to the host computer system which performs the evaluation step at step 510 of FIG. 6.

Although it will be recognized that several methodologies exist for this evaluation step, a preferred method would include the evaluation of the measured gain of the system at the test frequencies to see if the gain at any of these points was greater than a predetermined threshold value, or greater than a predetermined delta value for the gain at adjacent test frequencies. For the disc drive of the present example having the aforementioned 1.1 kHz resonance (as a result of actuator tilt), the gain at the associated test frequency would provide a peak in magnitude compared to adjacent test frequency gains. The host computer system could then calculate the phase shift at these frequencies to distinguish between noise and a true resonance, and in the present example such discontinuity in the phase shift would most likely occur, indicating a test failure. Thus, the error flag of step 514 (FIG. 6) would then be set, notifying the operator in a physical step (such as previously described including an output to a CRT display, the activation of an audio alarm, or the energizing of a test status LED), resulting in the rejection of the bad disc drive from the test environment.

Figure 16:
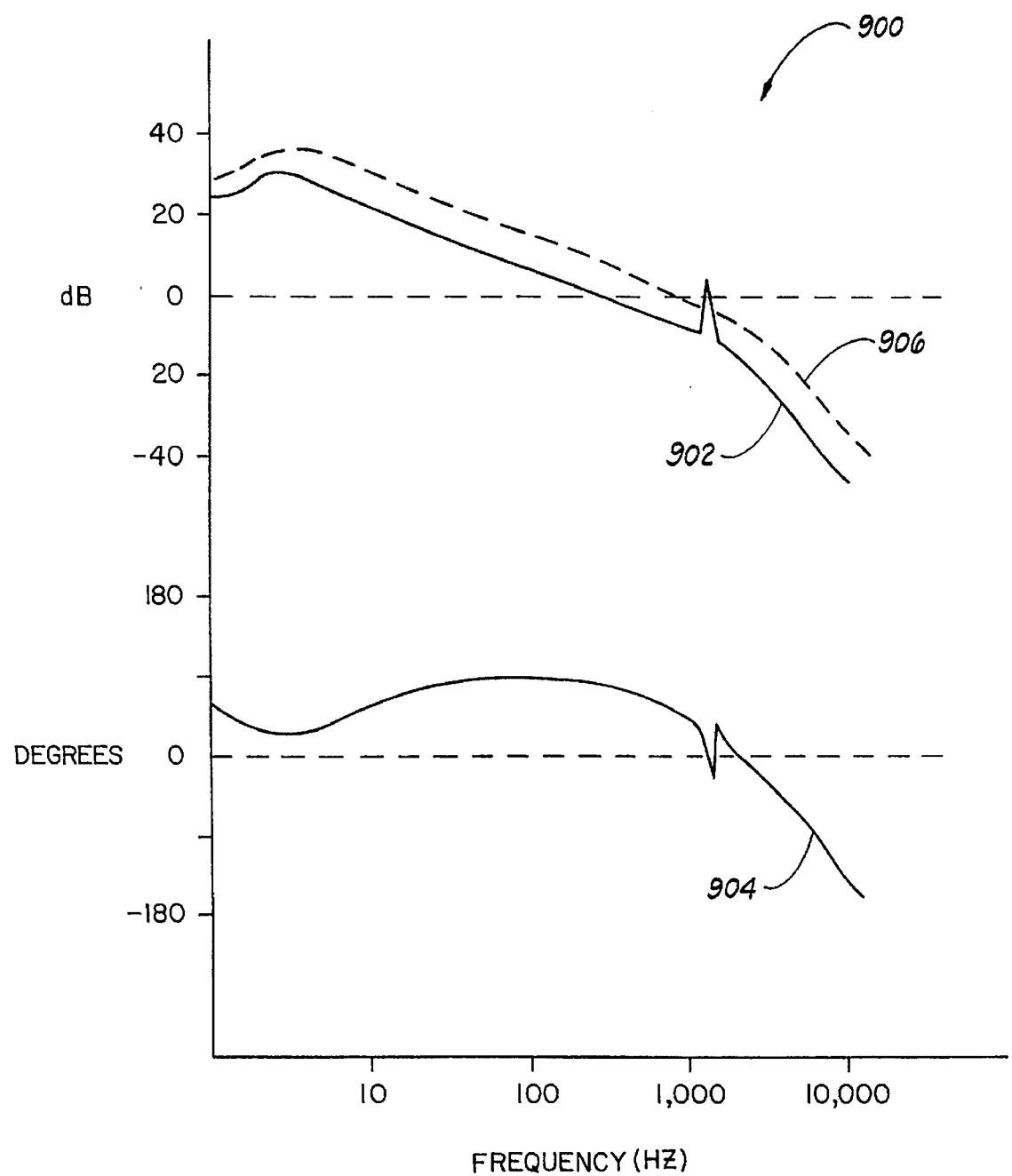
FIG. 16 is a graphical representation of a bode plot of the magnitude and phase response of a disc drive containing a mechanical defect and tested in accordance with the present invention.

FIG. 16 provides a bode plot 900 of the gain of the disc drive of the present example as determined by the present invention as hereinabove described. FIG. 16 shows a magnitude response plot 902 which is the magnitude of the gain of the loop (determined for each test frequency in accordance with equation (5) above) expressed in terms of dB (calculated as dB=20 log (magnitude of the gain)). FIG. 16 also shows a phase response plot 904 for the same test frequencies (determined for each test frequency in accordance with equation (6) above). As shown in FIG. 16, a localized increase in gain is shown on the magnitude response plot 902 at a test frequency near 1 kHz, indicating the presence of a resonance in the system as a result of a mechanical defect. Such a presence can be confirmed by examination of the phase response plot 904, which also exhibits a similar phase response discontinuity near this test frequency.

Additionally, a maximum acceptable threshold curve 906 is provided above the magnitude response plot 902, and it can be seen that the localized gain near 1 kHz exceeds this threshold curve. As described above, the maximum acceptable threshold curve 906 could be derived empirically to define the maximum acceptable gain during the test and subsequently used in the evaluation of the output from the test in order to determine whether the test has failed and to indicate the presence of a resonance in the disc drive structure as a result of a mechanical defect.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. In a disc drive having a disc and an actuator adjacent the disc, the actuator having a transducer positionably adjacent any selected one of a plurality of tracks on the disc surface, the disc drive having a servo control circuit operable as a servo loop for generating a correction signal in response to an incoming servo position error signal received from the transducer, the servo position error signal indicative of the relative position of the transducer to the selected track, the correction signal controlling the output of current from an actuator driver to an actuator coil to position the transducer with respect to the selected track in response to the servo position error signal, wherein the servo position error signal is obtained from the transducer in each of a succession of time intervals, a method for detecting mechanical defects in the disc drive comprising the steps of:

injecting a test signal having a selected frequency and magnitude into the incoming servo position error signal to generate a modified servo position error signal;

using the modified servo position error signal to generate a correction signal to control the current supplied to the actuator coil by the actuator driver;

sampling and accumulating data from the incoming servo position error signal to characterize the magnitude of a resonant signal in the incoming servo position error signal, the resonant signal having a frequency substantially equal to the test signal frequency;

determining a ratio of the magnitude of the resonant signal in the incoming servo position error signal to the magnitude of the test signal in the modified servo position error signal; and providing an indication when the ratio exceeds a preselected limit.

2. The method of claim 1, wherein the steps of sampling and accumulating data comprises the step of performing a discrete fourier transform over a plurality of time intervals.

3. In a disc drive of the type having a disc and an actuator including a coil and a transducer, the disc drive having a servo control circuit operable as a servo loop for generating a correction signal in response to servo position error information received from the transducer, the servo position error information indicative of the relative position of the transducer to a selected track on the disc, the correction signal controlling the output of current from an actuator driver to the actuator coil in order to position the transducer with respect to the selected track in response to the servo position error information, wherein the servo position error information is obtained from the transducer in each of a succession of time intervals, a method for detecting mechanical defects in the disc drive comprising the steps of:

in each of a predetermined number of said time intervals, receiving servo position error information from the transducer;

adding selected components of a digital representation of an injection test signal to the servo position error information to generate modified servo position error information, the injection test signal comprising a sinusoidal signal having a preselected frequency and magnitude;

using the modified servo position error information to generate a modified correction signal;

using the modified correction signal to control the output of current by the actuator driver to the actuator coil;

sampling and accumulating the servo position error information to characterize a first signal in the servo position error information, the first signal comprising a sinusoidal signal having a frequency and magnitude, the frequency of the first signal having a frequency substantially that of the injection test signal; and sampling and accumulating the modified servo position error information to characterize a second signal in the modified servo position error information, the second signal comprising a sinusoidal signal having a frequency and magnitude substantially that of the injection test signal;

thereafter, comparing the magnitude of the second signal to the magnitude of the first signal to determine the gain of the servo loop;

comparing the gain of the servo loop to a predetermined maximum limit; and setting an error flag at such time that the gain of the servo loop exceeds the predetermined maximum limit.

4. The method of claim 3, wherein the step of sampling and accumulating the servo position error information comprises the step of performing a discrete fourier transform to characterize the first signal in the servo position error information.

5. The method of claim 3, wherein the step of sampling and accumulating the modified servo position error information comprises the step of performing a discrete fourier transform to characterize the second signal in the modified servo position error information.

6. In a disc drive of the type having a disc and an actuator adjacent the disc, the actuator having a coil and a transducer, the disc drive further having a servo control circuit operable as a servo loop for generating a correction signal to position the transducer with respect to the disc in response to an incoming servo position error signal received from the transducer, the servo position error signal indicative of the relative position of the transducer to a selected track on the disc, the correction signal controlling the output of current from an actuator driver to an actuator coil, wherein the servo position error signal is obtained from the transducer in each of a succession of time intervals, the improvement comprising:

injection means for injecting a test signal of known frequency and magnitude into the incoming servo position error signal to generate a modified servo position error signal;

characterization means, responsive to the incoming servo position error signal, for characterizing the magnitude of a resonant signal resident in the incoming servo position error signal, the resonant signal having a frequency substantially that of the test signal; and determining means, responsive to the characterization means, for determining the gain of the servo loop using the magnitude of the resonant signal and the magnitude of the test signal in the modified servo position error signal and providing a signal indicative of the gain exceeding a preselected limit;

wherein the modified servo position error signal is used to generate a correction signal for controlling the current supplied by the actuator driver to the actuator coil.

7. The improved disc drive of claim 6, wherein the gain of the servo loop is determined by dividing the magnitude of the resonant signal by the magnitude of the test signal.

8. The improved disc drive of claim 6, wherein the characterization means uses a discrete fourier transform to characterize the magnitude of the resonant signal by sampling and accumulating data from the resonant signal over preselected number of said time intervals.

* * * * *

UNITED STATES PATENT AND TRADEMARK OFFICE
CERTIFICATE OF CORRECTION

PATENT NO. : 5,654,841
DATED : August 5, 1997
INVENTOR(S) : Daniel E. Hobson, Wayne L. Felts & Randall D. Hampshire It is certified that error appears in the above-indentified patent and that said Letters Patent is hereby corrected as shown below:

Column 3, line 59, delete "the".

Column 8, line 65, delete "134" and insert --124--.

Column 9, line 56, delete "passfail" and insert --pass\fail--.

Column 12, line 10, delete "by," and insert --by--.

Column 15, line 57 insert --system-- after 'computer'.

Column 15, line 63 delete "724" and insert --124--.

Column 18, line 26 insert --2πfT-- after 'K=a constant,'.

Signed and Sealed this

Twenty-ninth Day of September, 1998

Attest:

BRUCE LEHMAN

*Attesting Officer*  *Commissioner of Patents and Trademarks*